(12) United States Patent
Kim et al.

(10) Patent No.: US 10,228,547 B2
(45) Date of Patent: Mar. 12, 2019

(54) PROJECTION LENS SYSTEM AND PROJECTION SYSTEM

(71) Applicant: SAMSUNG ELECTRONICS CO., LTD., Suwon-si (KR)

(72) Inventors: Jung-hyung Kim, Yongin-si (KR); Hee-kyung Kim, Seongnam-si (KR); Jung-chul Park, Yongin-si (KR); Se-jun Song, Seongnam-si (KR); Sung-kwang Yang, Yongin-si (KR); Yoon-gi Lee, Anyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 117 days.

(21) Appl. No.: 15/241,181

(22) Filed: Aug. 19, 2016

(65) Prior Publication Data

US 2017/0052354 A1     Feb. 23, 2017

(30) Foreign Application Priority Data

Aug. 21, 2015    (KR) ........................ 10-2015-0118171

(51) Int. Cl.
     *G02B 17/08*      (2006.01)
     *G02B 13/16*      (2006.01)
     *G02B 13/18*      (2006.01)

(52) U.S. Cl.
     CPC ............. *G02B 17/08* (2013.01); *G02B 13/16* (2013.01); *G02B 13/18* (2013.01)

(58) Field of Classification Search
     CPC ........ G02B 17/80; G02B 13/16; G02B 13/18; G03B 21/28

(Continued)

(56) References Cited

U.S. PATENT DOCUMENTS

| 7,116,498 B2 | 10/2006 | Nishikawa et al. |
| 7,126,767 B2 | 10/2006 | Lu |

(Continued)

FOREIGN PATENT DOCUMENTS

| EP | 2246736 B1 | 8/2012 |
| EP | 2219072 B1 | 10/2012 |

(Continued)

OTHER PUBLICATIONS

International Search Report and Written Opinion dated Oct. 12, 2016 issued by the International Searching Authority in counterpart International Application No. PCT/KR2016/007989. (PCT/ISA/210, PCT/ISA/220, and PCT/ISA/237).

*Primary Examiner* — Collin X Beatty
(74) *Attorney, Agent, or Firm* — Sughrue Mion, PLLC

(57) ABSTRACT

A projection lens system which is arranged between an object side at which a micro-display panel is located and an image side at which a screen is located, and includes an aperture stop; a front lens group arranged at an object-side of the aperture stop and having a positive refractive power; a rear lens group arranged at an image-side of the aperture stop, the rear lens group including a first aspherical lens at a position closest to the image side and a second aspherical lens adjacent to an object-side surface of the first aspherical lens; and an aspherical mirror having a negative refractive power and reflecting light coming from the rear lens group toward the image side.

16 Claims, 39 Drawing Sheets
(5 of 39 Drawing Sheet(s) Filed in Color)

(58) Field of Classification Search
USPC .................. 359/728, 649, 717, 726, 727
See application file for complete search history.

(56) References Cited

U.S. PATENT DOCUMENTS

| | | |
|---|---|---|
| 7,175,287 B2 | 2/2007 | Gohman |
| 7,529,032 B2 | 5/2009 | Takaura et al. |
| 7,714,943 B2 | 5/2010 | Bassi et al. |
| 7,789,516 B2 | 9/2010 | Lee et al. |
| 8,014,075 B2 | 9/2011 | Minefuji |
| 8,279,527 B2 | 10/2012 | Lin |
| 8,587,873 B2 | 11/2013 | Yun et al. |
| 8,982,473 B2 | 3/2015 | Hsu et al. |
| 2008/0158439 A1 | 7/2008 | Nishikawa |
| 2009/0323202 A1* | 12/2009 | Chen ................ G02B 17/08 359/717 |
| 2011/0292515 A1* | 12/2011 | Kang ................ G02B 5/10 359/649 |
| 2014/0022519 A1* | 1/2014 | Amano ............. G02B 13/18 353/85 |

FOREIGN PATENT DOCUMENTS

| | | |
|---|---|---|
| JP | 2005-292813 A | 10/2005 |
| JP | 2014-170129 A | 9/2014 |
| KR | 10-2005-0090442 A | 9/2005 |
| KR | 10-0657338 B1 | 12/2006 |

\* cited by examiner

PROJECTION LENS SYSTEM AND PROJECTION SYSTEM

CROSS-REFERENCE TO RELATED APPLICATION

This application claims priority from Korean Patent Application No. 10-2015-0118171, filed on Aug. 21, 2015, in the Korean Intellectual Property Office, the disclosure of which is incorporated herein in its entirety by reference.

BACKGROUND

1. Field

Apparatuses and methods consistent with exemplary embodiments relate to a small projection lens system having a short focal length, and a projection system including the projection lens system.

2. Description of the Related Art

Projectors or projection systems are display devices configured to display images by projecting input image signals on a projection surface (screen) using light emitted from a light source such as a light-emitting diode (LED) or a lamp. In general, such display devices may be used when giving presentations in offices or in theater projectors or home theater systems.

Lens systems included in projection systems are used to project images onto a projection surface (screen) on an enlarged scale, and thus large images may be provided to viewers.

Projection systems may provide a large screen to viewers by enlarging images formed by a commonly used micro-display using a projection lens system. Examples of such micro-displays include a liquid crystal display (LCD), a digital micromirror display (DMD), and a liquid crystal display on silicon (LCoS).

In general, since wide-angle projection lens systems provide large images in spite of a short projection distance, wide-angle projection lens systems are less affected by installation spaces. Thus, wide-angle projection lens systems may be used to construct small projection systems.

SUMMARY

One or more exemplary embodiments provide small projection lens systems and projection systems including the projection lens systems.

One or more exemplary embodiments provide small projection lens systems having an ultra short focal length and projection systems including the projection lens systems.

According to an aspect of an exemplary embodiment, there is provided a projection lens system in which at least one lens is arranged between an object side at which a micro-display panel is located and an image side at which a screen is located, the projection lens system including: an aperture stop; a front lens group arranged at an object-side of the aperture stop and having a positive refractive power; a rear lens group arranged at an image-side of the aperture stop, the rear lens group including a first aspherical lens at the most image side and a second aspherical lens adjacent to an object-side surface of the first aspherical lens; and an aspherical mirror having a negative refractive power and reflecting light coming from the rear lens group toward the image side, wherein the projection lens system satisfies the following equation:

$$2.6 < |R25/R24| < 3.2 \qquad \text{<Equation>}$$

wherein R24 refers to a radius of curvature of an object-side surface of the second aspherical lens and R25 refers to a radius of curvature of an image-side surface of the second aspherical lens.

The front lens group may include at least one aspherical lens.

The front lens group may include a third aspherical lens at the most image side.

The projection lens system may further include an optical path converter between the front lens group and the micro-display panel so as to change an optical path of light.

The rear lens group may include a first sub-lens group having a positive refractive power and a second sub-lens group having a negative refractive power that are arranged in a direction from the object side toward the image side, and the first and second aspherical lenses may be included in the second sub-lens group.

The first sub-lens group may include three spherical lenses.

The projection lens system may have a throw ratio TR satisfying the following equation:

$$1.0 \leq TR \leq 0.3 \qquad \text{<Equation>}$$

The projection lens system may have a projection distance of about 15 cm or shorter.

The projection lens system may have a projection distance of about 12 cm or shorter.

The projection lens system may have a focal length of about 1.5 mm or shorter.

According to an aspect of another exemplary embodiment, there is provided a projection lens system in which at least one lens is arranged between an object side at which a micro-display panel is located and an image side at which a screen is located, the projection lens system including: an aperture stop; a front lens group arranged at an object-side of the aperture stop and having a positive refractive power; a rear lens group arranged at an image-side of the aperture stop, the rear lens group including a first sub-lens group having a positive refractive power and a second sub-lens group having a negative refractive power; and an aspherical mirror having a negative refractive power and reflecting light coming from the rear lens group toward the image side, wherein the front lens group may include an aspherical lens at the most image side.

According to an aspect of another exemplary embodiment, there is provided a projection lens system in which at least one lens is arranged between an object side at which a micro-display panel is located and an image side at which a screen is located, the projection lens system including: an aperture stop; a front lens group arranged at an object-side of the aperture stop and having a positive refractive power; a rear lens group arranged at an image-side of the aperture stop, the rear lens group including a first aspherical lens at the most image side and a second aspherical lens adjacent to an object-side surface of the first aspherical lens; and an aspherical mirror having a negative refractive power and reflecting light coming from the rear lens group toward the image side, wherein the projection lens system has a throw ratio TR satisfying the following equation:

$$0.1 \leq TR \leq 0.3 \qquad \text{<Equation>}$$

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and/or other aspects will become more apparent by describing certain exemplary embodiments, with reference to the accompanying drawings, in which.

DETAILED DESCRIPTION

Figure 1:
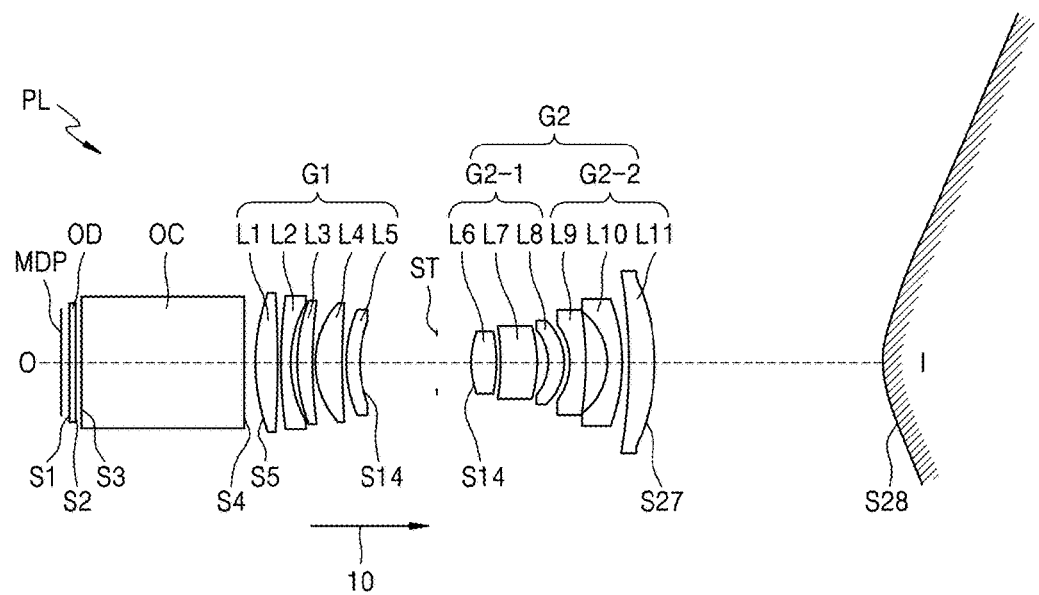
FIG. 1 is a view illustrating a projection lens system according to an exemplary embodiment.

Certain exemplary embodiments will be described in greater detail with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail.

As used herein, the term "and/or" includes any and all combinations of one or more of the associated listed items. Expressions such as "at least one of," when preceding a list of elements, modify the entire list of elements and do not modify the individual elements of the list.

Hereinafter, projection lens systems and projection systems including the projection lens systems will be described according to embodiments with reference to the accompanying drawings.

FIG. 1 is a view illustrating a projection lens system PL according to an exemplary embodiment.

The projection lens system PL may include a front lens group G1 having a positive refractive power, an aperture stop ST, and a rear lens group G2 that are sequentially arranged in a direction 10 from an object side O toward an image side I.

In the following description, the object side O may refer to a side along an optical axis at which a micro-display panel MDP is placed to form images, and the image side I may refer to a side along the optical axis at which a projection surface (or a screen SC) is located to display images.

The front lens group G1 is arranged at an object-side of the aperture stop ST, and the rear lens group G2 may be arranged at an image-side the aperture stop ST. The rear lens group G2 may have a positive refractive power or a negative refractive power. For example, the rear lens group G2 may include a first sub-lens group G2-1 having a positive refractive power and a second sub-lens group G2-2 having a negative refractive power, and the first sub-lens group G2-1 and the second sub-lens group G2-2 may be arranged in a direction away from the object side O toward the image side I.

A mirror M may be arranged at an image-side of the second sub-lens group G2-2. The mirror M may be an aspherical mirror.

For example, the front lens group G1 may include at least one aspherical lens. The aspherical lens may be arranged on a side of the front lens group G1 that is most adjacent to the image side I. The aspherical lens of the front lens group G1 which is the most adjacent to the image side I among lenses of the front lens group G1 may modulate light coming from the micro-display panel MDP in front of the rear lens group G2, and thus the effect of the aspherical lens may be increased for effective image correction. However, the front lens group G1 may include no aspherical lens.

The front lens group G1 may include a plurality of lenses, for example, five lenses. However, the front lens group G1 is not limited thereto. That is, the number of lenses of the front lens group G1 may vary. The front lens group G1 may include a first lens L1 having a positive refractive power, a second lens L2 having a negative refractive power, a third lens L3 having a positive refractive power, a fourth lens L4 having a positive refractive power, and a fifth lens L5 having a positive refractive power. The fifth lens L5 may be an aspherical lens.

Alternatively, all of the first to fifth lenses L1 to L5 may be aspherical lenses. Alternatively, all of the first to fifth lenses L1 to L5 may be spherical lenses. The front lens group G1 may condense image light formed by the micro-display panel MDP.

An optical path converter (OC) may be placed between the micro-display panel MDP and the front lens group G1. For example, the optical path converter OC may include a prism. However, the optical path converter OC is not limited thereto. That is, the optical path converter OC may include an optical element such as a reflection mirror or a beam splitter. An optical path of the projection lens system PL may be bent at a right angle by the optical path converter OC. The optical path converter OC changes an optical path so that lenses may be efficiently arranged in terms of space utilization and the projection lens system PL may have a small size.

At least one optical element OD may be placed between the micro-display panel MDP and the first lens L1. The optical element OD may include at least one of a low-pass filter, an infrared (IR)-cut filter, and cover glass. For example, if the optical element OD includes an IR-cut filter, visible light rays may pass through the optical element OD but infrared rays may not pass through the optical element OD. Thus, infrared rays may not reach an image plane. However, the projection lens system PL may not include the optical element OD.

For example, the first sub-lens group G2-1 may diverge a light beam passing through the aperture stop ST. For example, the first sub-lens group G2-1 may include three lenses. However, the first sub-lens group G2-1 is not limited thereto. That is, the number of lenses of the first sub-lens group G2-1 may vary. For example, the first sub-lens group G2-1 may include a sixth lens L6 having a positive refractive power, a seventh lens L7 having a positive or negative refractive power, and an eighth lens L8 having a positive or negative refractive power.

For example, the sixth lens L6 of the first sub-lens group G2-1 may be a biconvex lens, and the seventh and eighth lenses L7 and L8 may have a meniscus shape. The seventh lens L7 may be a meniscus lens that is convex toward the image side I. The eighth lens L8 may be a meniscus lens that is convex toward the image side I.

The first sub-lens group G2-1 may include at least one spherical lens. For example, the first sub-lens group G2-1 may include three spherical lenses. Each of the sixth lens L6 the seventh lens L7 and the eighth lens L8 may be a spherical lens.

For example, the second sub-lens group G2-2 may include three lenses. The second sub-lens group G2-2 may include at least one negative lens. For example, the second sub-lens group G2-2 may include a ninth lens L9 having a negative refractive power, a tenth lens L10 having a negative refractive power, and an eleventh lens L11 having a positive refractive power. The ninth lens L9 may be a meniscus lens that is convex toward the image side I. The tenth lens L10 may be a meniscus lens that is convex toward the image side I. The eleventh lens L11 may be a biconvex lens or a meniscus lens that is convex toward the image side I. For example, the second sub-lens group G2-2 may include three negative lenses.

The second sub-lens group G2-2 may include at least one aspherical lens. For example, the second sub-lens group G2-2 may include: a first aspherical lens that is most adjacent to the image side I; and a second aspherical lens adjacent to an object-side surface of the first aspherical lens. For example, the eleventh lens L11 may be the first aspherical lens, and the tenth lens L10 may be the second aspherical lens.

The mirror M may be an aspherical mirror. The mirror M may be convex toward the image side I so as to enlarge images by diverging light beams.

Figure 2:
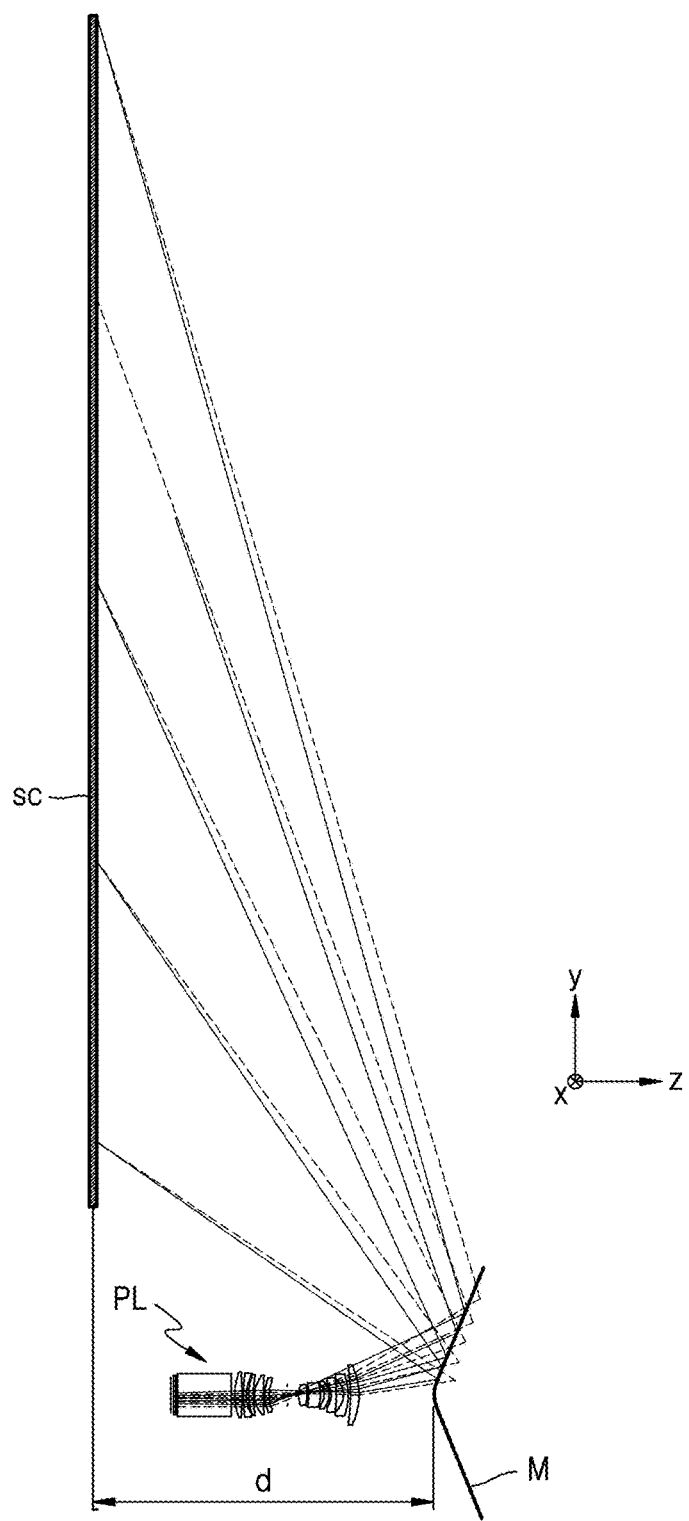
FIG. 2 is a cross-sectional view of the projection lens system taken along a plane YZ to illustrate a layout of rays in the plane YZ according to an exemplary embodiment.
Figure 3:
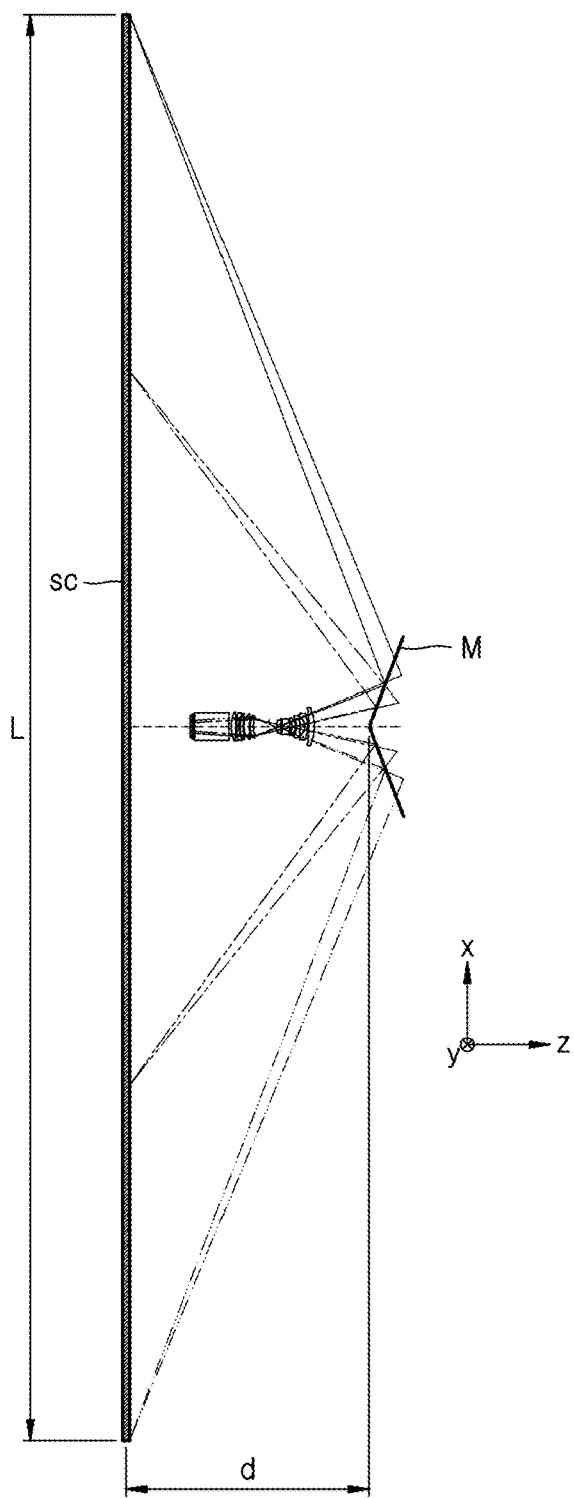
FIG. 3 is a cross-sectional view of the projection lens system taken along a plane XZ to illustrate a layout of the rays in the plane XZ according to an exemplary embodiment.

FIG. 2 is a cross-sectional view of the projection lens system PL taken along a plane YZ to illustrate a layout of rays in the plane YZ according to an exemplary embodiment, and FIG. 3 is a cross-sectional view of the projection lens system PL taken along a plane XZ to illustrate a layout of the rays in the plane XZ according to an exemplary embodiment.

As illustrated in FIGS. 2 and 3, the mirror M may reflect an image, enlarged by the front lens group G1 and the rear lens group G2, toward a screen SC. Therefore, the projection lens system PL and the screen SC may be arranged at the same side with reference to the mirror M. An image transmitted from the projection lens system PL may be enlarged toward the image side I by the mirror M so as to provide a wide field of view.

Referring to FIGS. 2 and 3, d is a projection distance defined from the vertex of the mirror M to the screen SC, and L is the width of the screen SC. In this case, a throw ratio is d/L. If the throw ratio is low, images projected a short distance may be highly magnified, and thus even though the projection lens system PL is small, the projection lens system PL may have a high magnification.

The projection lens system PL of an exemplary embodiment may satisfy the following equation:

$$0.1 \leq TR \leq 0.3 \qquad \text{<Equation 1>}$$

where TR refers to a throw ratio.

The projection lens system PL may have a projection distance d of about 15 cm or less. For example, the projection lens system PL may have a projection distance d of about 12 cm or shorter. For example, the projection lens system PL may have a projection distance d of about 10 cm or less.

For example, the width L of the screen SC may be about 60 cm or less when the projection distance d is about 10 cm. The width L of the screen SC may be increased up to about 67 cm. That is, the projection lens system PL may project images onto a large screen even though the projection lens system PL has a short projection distance.

The projection lens system PL may have a focal length of about 1.5 mm or shorter. For example, the projection lens system PL may have a focal length of about 0.8 mm to about 1.5 mm. For example, the projection lens system PL may have a field of view within the range of about 140° or greater. For example, the projection lens system PL may have a field of view within the range of about 140° to about 175°. That is, even though the projection lens system PL has a short projection distance, the projection lens system PL may project images on an enlarged scale to provide a wide field of view.

The projection lens system PL of an exemplary embodiment may satisfy the following equation:

$$2.6 < |R25/R24| < 3.2 \qquad \text{<Equation 2>}$$

where R24 refers to the radius of curvature of an object-side surface of the second aspherical lens which is the second lens of the second sub-lens group G2-2 in a direction from the image side I, and R25 refers to the radius of curvature of an image-side surface of the second aspherical lens.

If |R25/R24| satisfies Equation 2, the spherical aberration and chromatic aberration of the projection lens system PL may be easily corrected.

In the projection lens system PL of an exemplary embodiment, the term "aspherical" or "aspherical surface" has the following definition.

When an optical axis is set as an x-axis, a direction perpendicular to the optical axis is set as a y-axis, and the propagation direction of rays is denoted as a positive direction, an aspherical surface of a lens may be defined by Equation 3. In Equation 3, x denotes a distance measured from the vertex of the lens in the direction of the optical axis of the lens, y denotes a distance measured from the optical axis in a direction perpendicular to the optical axis, K denotes a conic constant, A, B, C, D, . . . denote aspherical coefficients, and c denotes the reciprocal (1/R) of the radius of curvature at the vertex of the lens.

$$x = \frac{cy^2}{1 + \sqrt{1 - (K+1)c^2 y^2}} + Ay^4 + By^6 + Cy^8 + Dy^{10} + \ldots \qquad \text{<Equation 3>}$$

Variously projection lens systems may be provided according to numerical embodiments as described below.

In the following numerical embodiments, lens surfaces are sequentially numbered with S1, S2, S3, . . . , Sn (n is a natural number) in a direction from an object side O to an image side I, and in the drawings, the surfaces of lenses of each lens group most adjacent to the object side O or the image side I are only numbered for conciseness of illustration. In addition, EFL refers to a focal length and FOV refers to a field of view. Thickness refers to the thickness of a lens along an optical axis or a distance between lenses. ST refers to an aperture stop, Asphere refers to an aspherical surface, and Sphere refers to a spherical surface.

FIRST EXAMPLE

Table 1 shows design data in the first example, according to an exemplary embodiment.

TABLE 1

| Lens surfaces | Note | Type | Radius of curvature | Thickness | Abbe number |
|---|---|---|---|---|---|
| Object surface | MDP | Sphere | Infinity | 0.71 | |
| S1 | OD | Sphere | Infinity | 0.65 | 63 |
| S2 | | Sphere | Infinity | 0.5 | |
| S3 | OC | Sphere | Infinity | 15 | 39 |
| S4 | | Sphere | Infinity | 1 | |
| S5 | | Sphere | 16.7 | 2.1 | 6 |
| S6 | | Sphere | −84.06 | 0.2 | |
| S7 | | Sphere | 31.86 | 1 | 28 |
| S8 | | Sphere | 11.51 | 0.68 | |
| S9 | | Sphere | 18.49 | 1.37 | 61 |
| S10 | | Sphere | 38.54 | 0.2 | |
| S11 | | Sphere | 8.15 | 2.61 | 82 |
| S12 | | Sphere | 126.04 | 0.22 | |
| S13 | | Asphere | 9.52 | 1.38 | 7 |
| S14 | | Asphere | 14.86 | 7.06 | |
| S15 | ST | Sphere | Infinity | 3.36 | |
| S16 | | Sphere | 11.37 | 2.18 | 7 |
| S17 | | Sphere | 58.07 | 0.24 | |
| S18 | | Sphere | −31.74 | 3.44 | 49 |
| S19 | | Sphere | −19.95 | 1.08 | |
| S20 | | Sphere | −5.83 | 1.48 | 28 |
| S21 | | Sphere | −5.8 | 0.53 | |
| S22 | | Sphere | −7.2 | 1.45 | 45 |
| S23 | | Sphere | −69.28 | 1.98 | |
| S24 | | Asphere | −6.82 | 1.47 | 58 |
| S25 | | Asphere | −18.59 | 0.55 | |
| S26 | | Asphere | 330.59 | 2.42 | 23 |
| S27 | | Asphere | −23.54 | 23 | |
| S28 | M | Asphere | 11.75 | −101.5 | |
| Image plane | SC | | Infinity | 0 | |

Table 2 below shows aspherical coefficients in the first example.

In the first example, a lens of the front lens group G1 most adjacent to the image side I may be an aspherical lens, and two lenses of the rear lens group G2 most adjacent to the image side I may be aspherical lenses.

Figure 4:
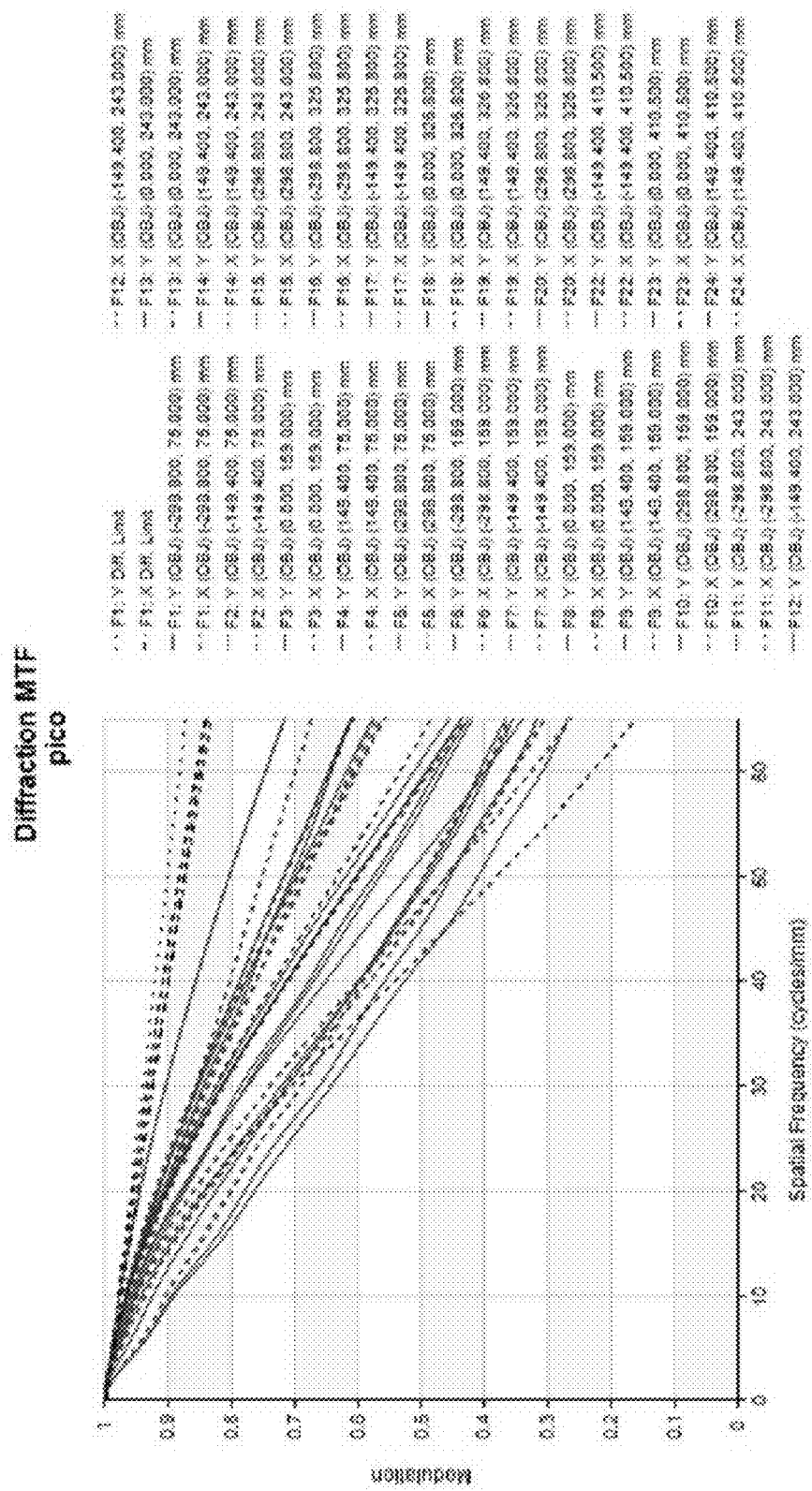
FIG. 4 is a modulation transform function (MTF) graph of a first example.
Figure 5:
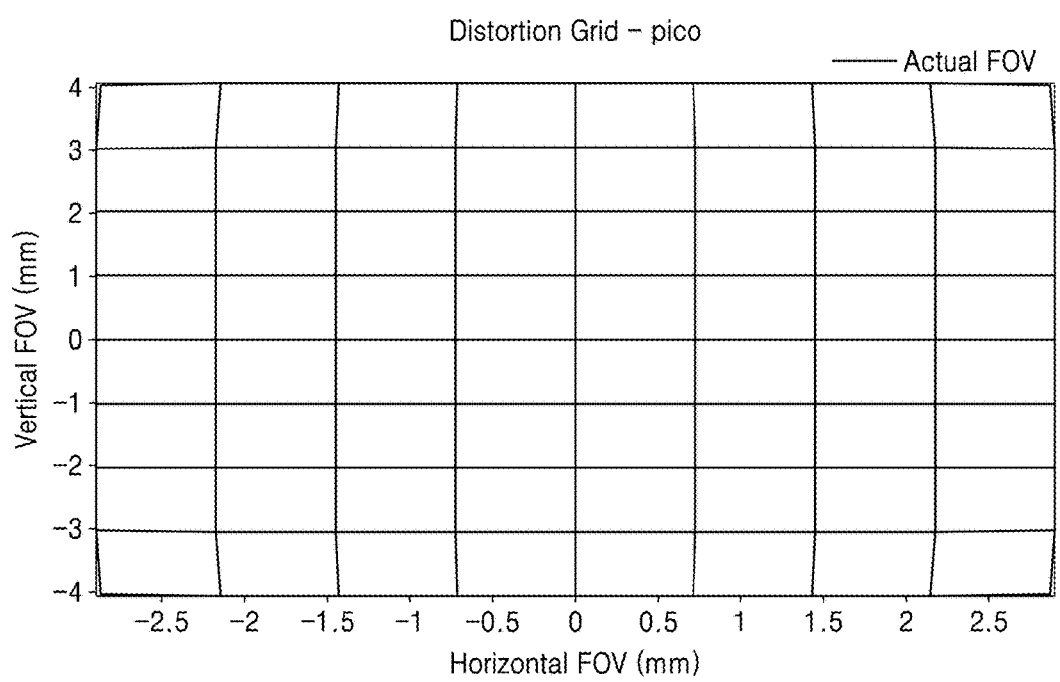
FIG. 5 is an aberration graph illustrating distortion in the first example.
Figure 6:
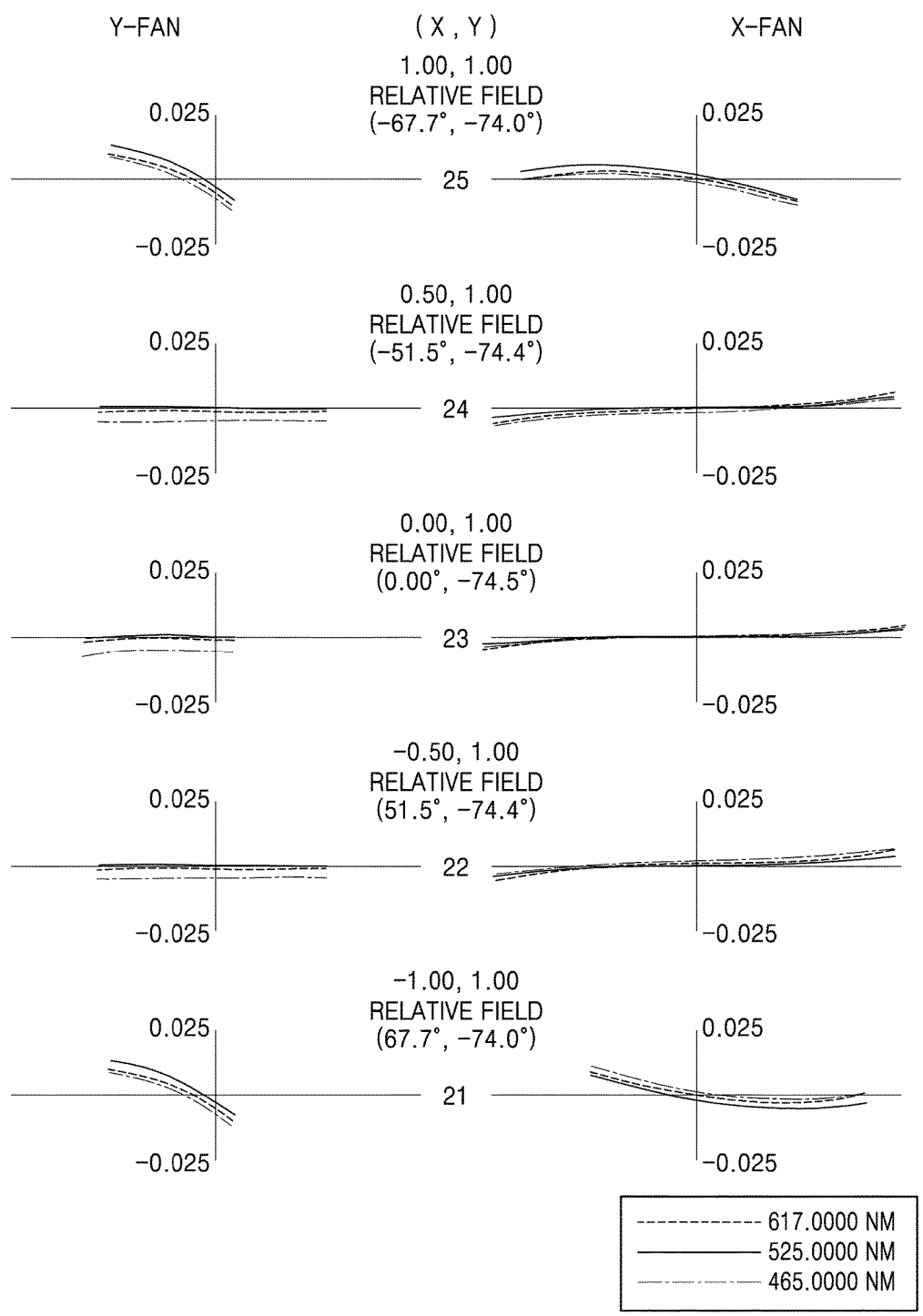
FIGS. 6, 7, 8, 9, and 10 are graphs illustrating ray aberration in each field of the projection lens system of the first example.
Figure 7:
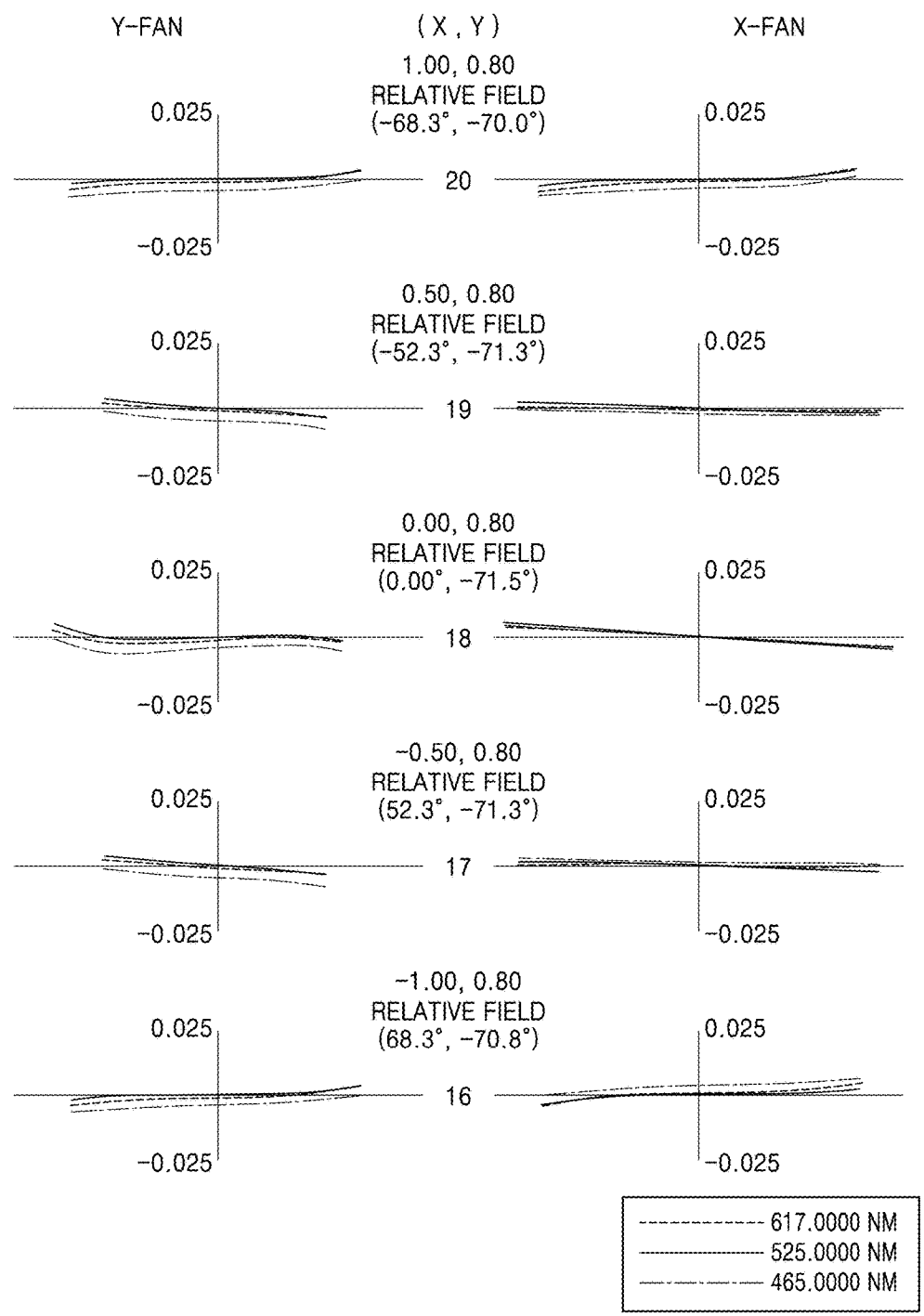
Figure 8:
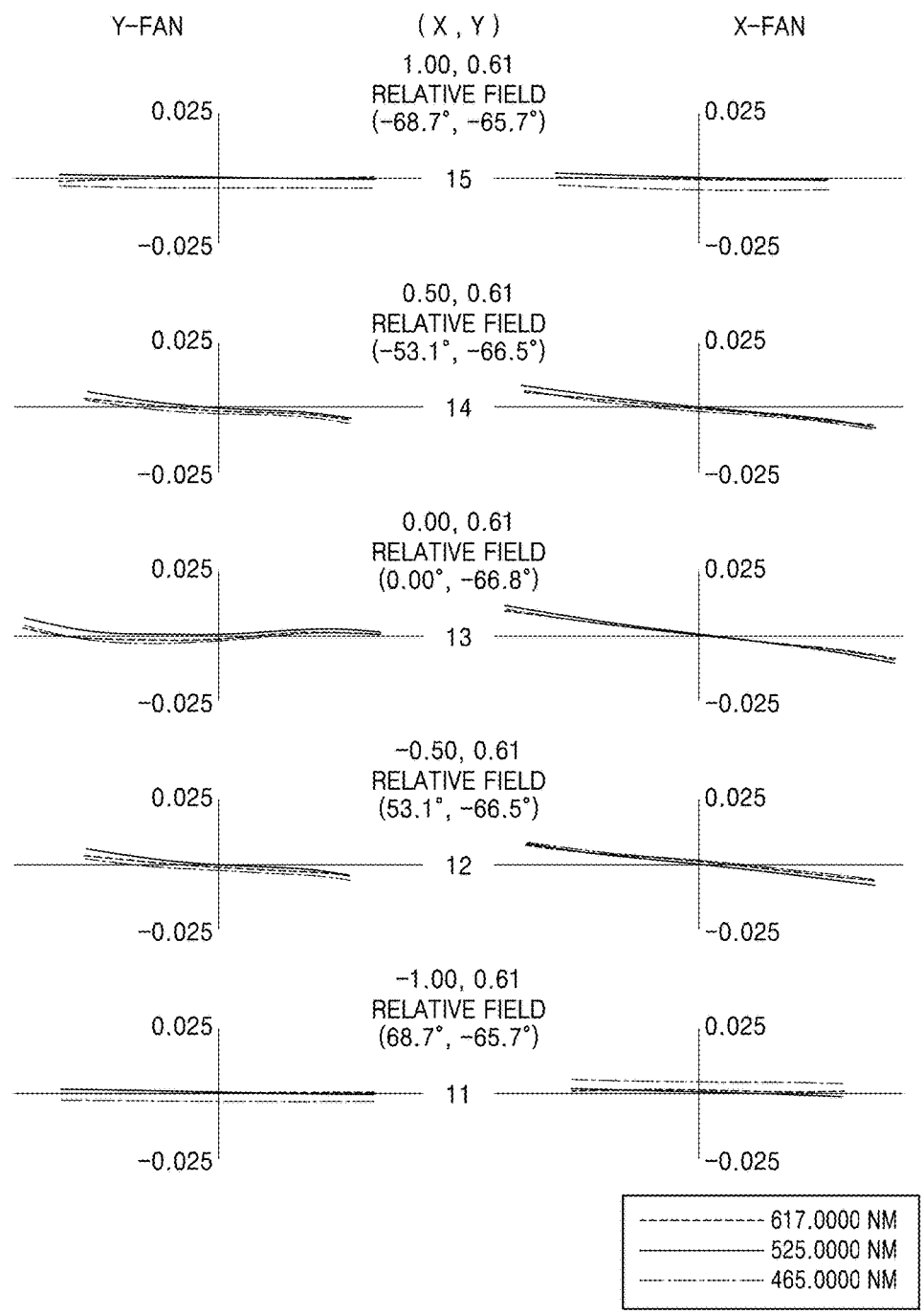
Figure 9:
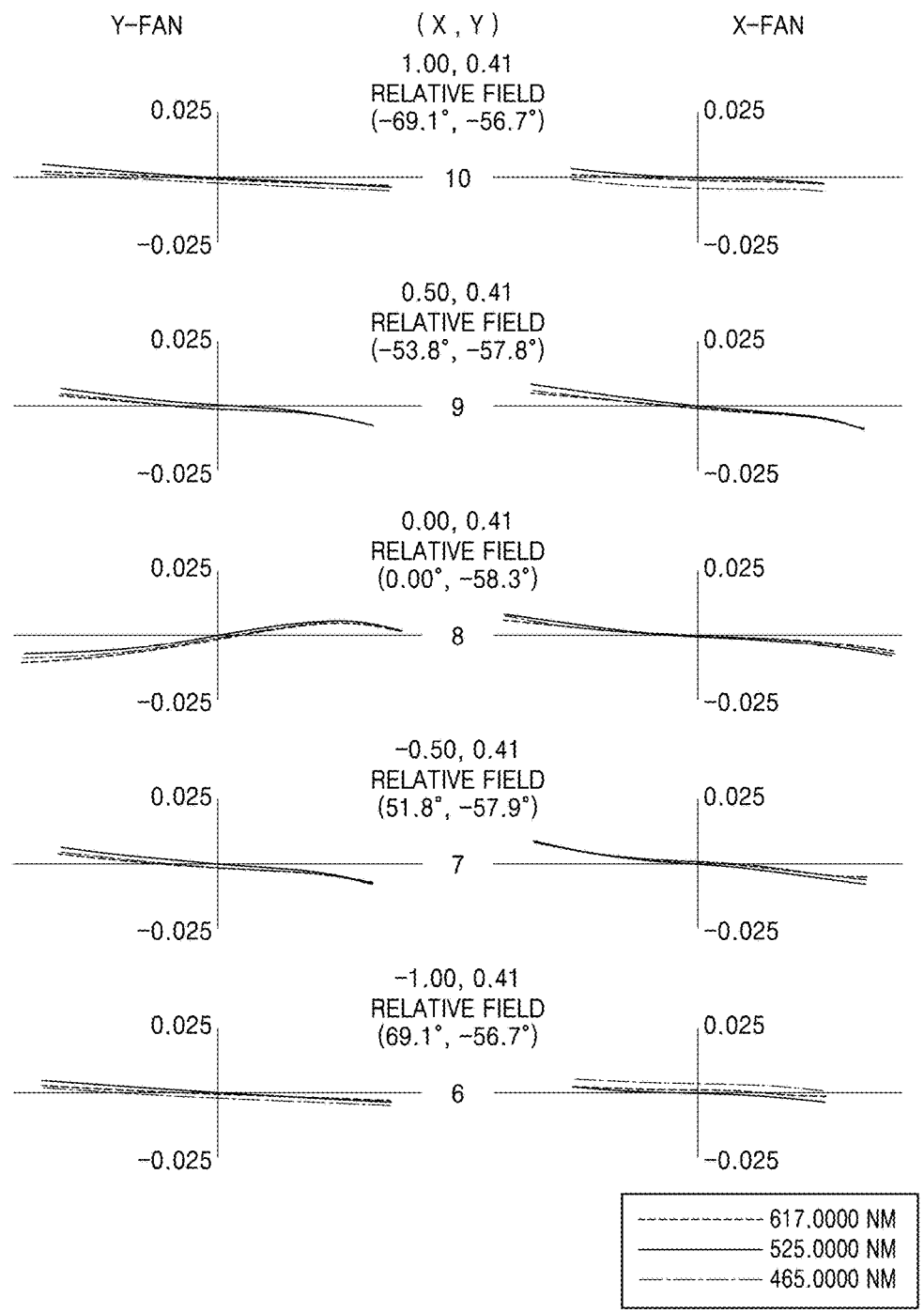
Figure 10:
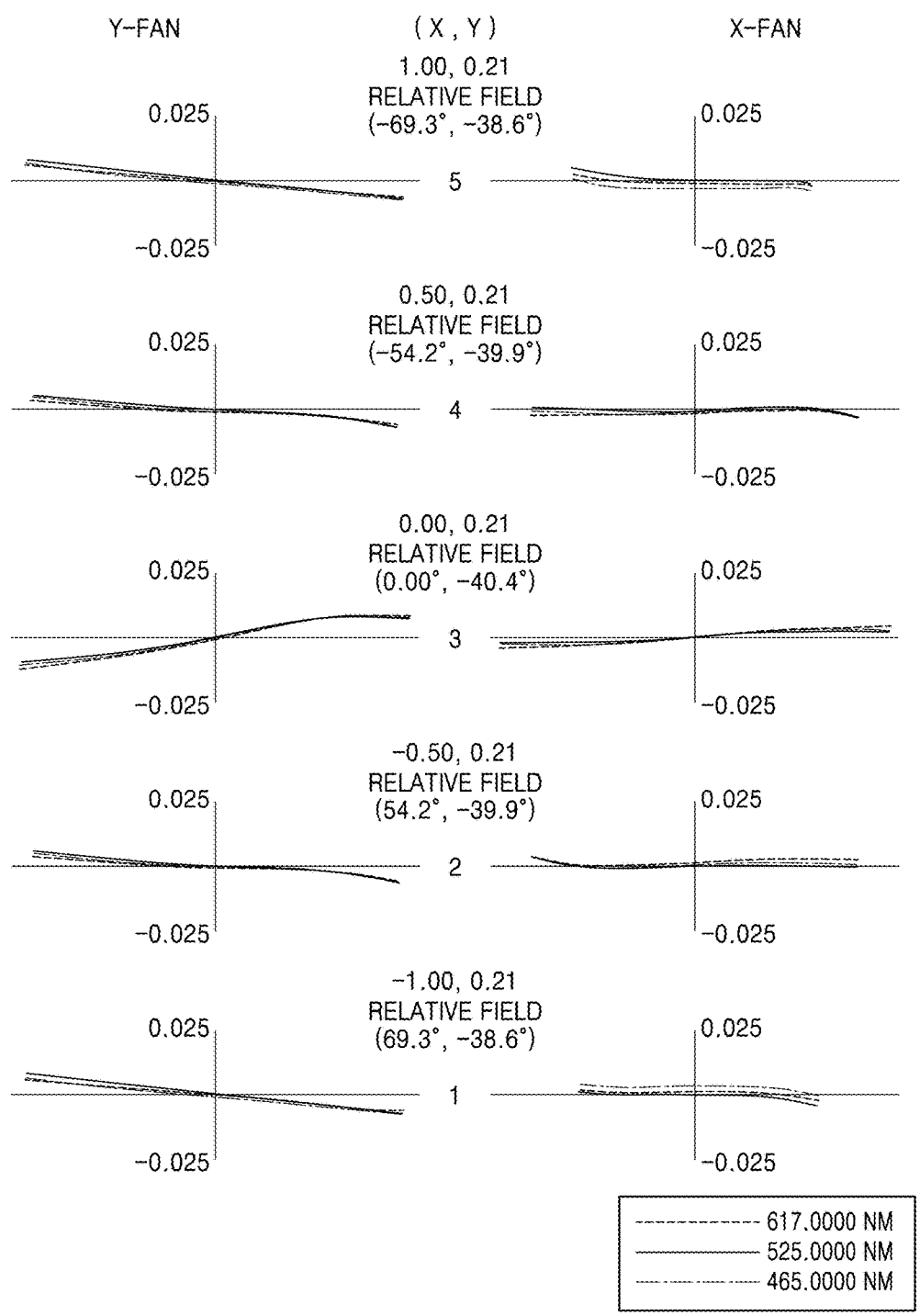

FIG. 4 is a modulation transform function (MTF) graph of the projection lens system PL of the first example, and FIG. 5 is a distortion graph of the projection lens system PL of the first example.

FIGS. 6, 7, 8, 9, and 10 illustrate ray aberration in each field of the projection lens system PL of the first example.

In the MTF graph, the x-axis refers to spatial frequency and the y-axis refers to modulation. The spatial frequency is the number of sine waves per millimeter. The maximum of the modulation is 1, and when the modulation is 1, MTF is 100%. Referring to FIG. 4, an MTF ratio does not steeply decrease, and thus sharpness, contrast, and an image recognition ratio may be maintained at high-quality levels. Referring to the distortion graph, image distortion may be effectively corrected.

The ray aberration is lateral color, and it is shown that chromatic aberration is effectively corrected.

In the first example, if the front lens group G1 includes an aspherical lens at a position most adjacent to the image side I, and the rear lens group G2 includes two aspherical lenses at positions most adjacent to the image side I, the projection lens system PL may have a length of about 10 cm or shorter and a throw ratio RT of about 0.17. That is, the projection lens system PL may have an ultra short focal length.

SECOND EXAMPLE

Table 3 below shows design data according to a second example, according to an exemplary embodiment.

TABLE 3

| Lens surfaces | Note | Type | Radius of curvature | Thickness | Abbe number |
|---|---|---|---|---|---|
| Object surface | MDP | Sphere | Infinity | 0.71 | |

TABLE 2

| Lens | Lens surfaces | Radius of curvature | K | 4th Order Coefficient (A) | 6th Order Coefficient (B) | 8th Order Coefficient (C) | 10th Order Coefficient (D) |
|---|---|---|---|---|---|---|---|
| Aspherical mirror | S28 | 11.75 | −4.74 | −3.3716E−06 | −3.0490E−09 | 3.2614E−11 | −8.6640E−14 |
| L11 | S27 | −23.54 | 3.37 | −3.9924E−05 | 7.2275E−07 | −1.4656E−07 | 3.5022E−09 |
| | S26 | 330.59 | 10.0 | −2.8319E−04 | 1.8549E−05 | −1.5341E−06 | 5.5524E−08 |
| L10 | S25 | −18.59 | −10.0 | −8.7156E−05 | 5.3232E−07 | −1.5367E−07 | 9.4291E−10 |
| | S24 | −6.82 | 0.34 | 2.2150E−04 | −4.3377E−05 | 3.1582E−06 | −1.0848E−07 |
| L5 | S14 | 14.86 | 2.91 | 1.0273E−04 | 1.4082E−06 | −4.3057E−09 | 4.8489E−09 |
| | S13 | 9.52 | −0.80 | −1.1102E−04 | −2.6407E−06 | 2.4621E−08 | 3.2481E−10 |

| Lens | Lens surfaces | 12th Order Coefficient (E) | 14th Order Coefficient (F) | 16th Order Coefficient (G) | 18th Order Coefficient (H) | 20th Order Coefficient (J) |
|---|---|---|---|---|---|---|
| Aspherical mirror | S28 | 1.2694E−16 | −1.1211E−19 | 5.9166E−23 | −1.7165E−26 | 2.1050E−30 |
| L11 | S27 | −2.0790E−11 | −3.4085E−37 | −3.4085E−37 | | |
| | S26 | −1.0006E−09 | 9.1511E−12 | −3.4208E−14 | | |
| L10 | S25 | −7.0360E−35 | −3.4085E−37 | | | |
| | S24 | −7.0360E−35 | −3.4085E−37 | | | |
| L5 | S14 | 2.4307E−35 | | | | |
| | S13 | 2.4307E−35 | | | | |

TABLE 3-continued

| Lens surfaces | Note | Type | Radius of curvature | Thickness | Abbe number |
|---|---|---|---|---|---|
| S1 | OD | Sphere | Infinity | 0.65 | 63 |
| S2 | | Sphere | Infinity | 0.5 | |
| S3 | OC | Sphere | Infinity | 15 | 39 |
| S4 | | Sphere | Infinity | 1 | |
| S5 | | Sphere | 16.33 | 2.83 | 6 |
| S6 | | Sphere | −25.77 | 0.2 | |
| S7 | | Sphere | 23.66 | 1 | 28 |
| S8 | | Sphere | 9.12 | 1.19 | |
| S9 | | Sphere | 33.12 | 1.86 | 61 |
| S10 | | Sphere | −42.76 | 0.2 | |
| S11 | | Sphere | 13.8 | 1.57 | 82 |
| S12 | | Sphere | 69.69 | 0.2 | |
| S13 | | Sphere | 7.48 | 1.74 | 7 |
| S14 | | Sphere | 15.41 | 5.8 | |
| S15 | ST | Sphere | Infinity | 1.75 | |
| S16 | | Sphere | 18.64 | 1.27 | 7 |
| S17 | | Sphere | 82.78 | 0.4 | |
| S18 | | Sphere | −15.97 | 2.12 | 49 |
| S19 | | Sphere | −10.08 | 0.1 | |
| S20 | | Sphere | −8.86 | 2.65 | 28 |
| S21 | | Sphere | −8.88 | 0.5 | |
| S22 | | Sphere | −9.17 | 1.84 | 45 |
| S23 | | Sphere | −14.07 | 1.47 | |
| S24 | | Asphere | −6.4 | 1.3 | 58 |
| S25 | | Asphere | −80.63 | 1.76 | |
| S26 | | Asphere | −135.81 | 2.54 | 23 |
| S27 | | Asphere | −18 | 23 | |
| S28 | M | Asphere | 9.05 | −101.5 | |
| Image plane | SC | Sphere | Infinity | 0 | |

Table 4 below shows aspherical coefficients in the second example.

TABLE 4

| Lens | Lens surfaces | Y Radius | Conic Constant (K) | 4th Order Coefficient (A) | 6th Order Coefficient (B) | 8th Order Coefficient (C) | 10th Order Coefficient (D) |
|---|---|---|---|---|---|---|---|
| Aspherical mirror | S28 | 9.05 | −4.46 | −4.4742E−06 | −4.2307E−09 | 5.3183E−11 | −1.5958E−13 |
| L11 | S27 | −18.00 | −0.06 | 2.0662E−04 | −1.1819E−06 | −1.4996E−07 | 3.4023E−09 |
| | S26 | −135.81 | 10.00 | −1.4793E−04 | 1.9628E−05 | −1.5541E−06 | 5.5409E−08 |
| L10 | S25 | −80.63 | −10.00 | 4.8805E−05 | 4.9442E−07 | 4.0899E−09 | −7.2877E−10 |
| | S24 | −6.40 | 0.09 | −1.1194E−04 | −1.4719E−06 | 7.2622E−08 | −1.4677E−08 |

| Lens | Lens surfaces | 12th Order Coefficient (E) | 14th Order Coefficient (F) | 16th Order Coefficient (G) | 18th Order Coefficient (H) | 20th Order Coefficient (J) |
|---|---|---|---|---|---|---|
| Aspherical mirror | S28 | 2.6398E−16 | −2.6343E−19 | 1.5706E−22 | −5.1463E−26 | 7.1282E−30 |
| L11 | S27 | −2.0790E−11 | | | | |
| | S26 | −1.0006E−09 | 9.1511E−12 | −3.4208E−14 | | |
| L10 | S25 | | | | | |
| | S24 | | | | | |

In the second example, a front lens group G1 may not include an aspherical lens, and a rear lens group G2 may include two aspherical lenses most adjacent to an image side I.

Figure 11:
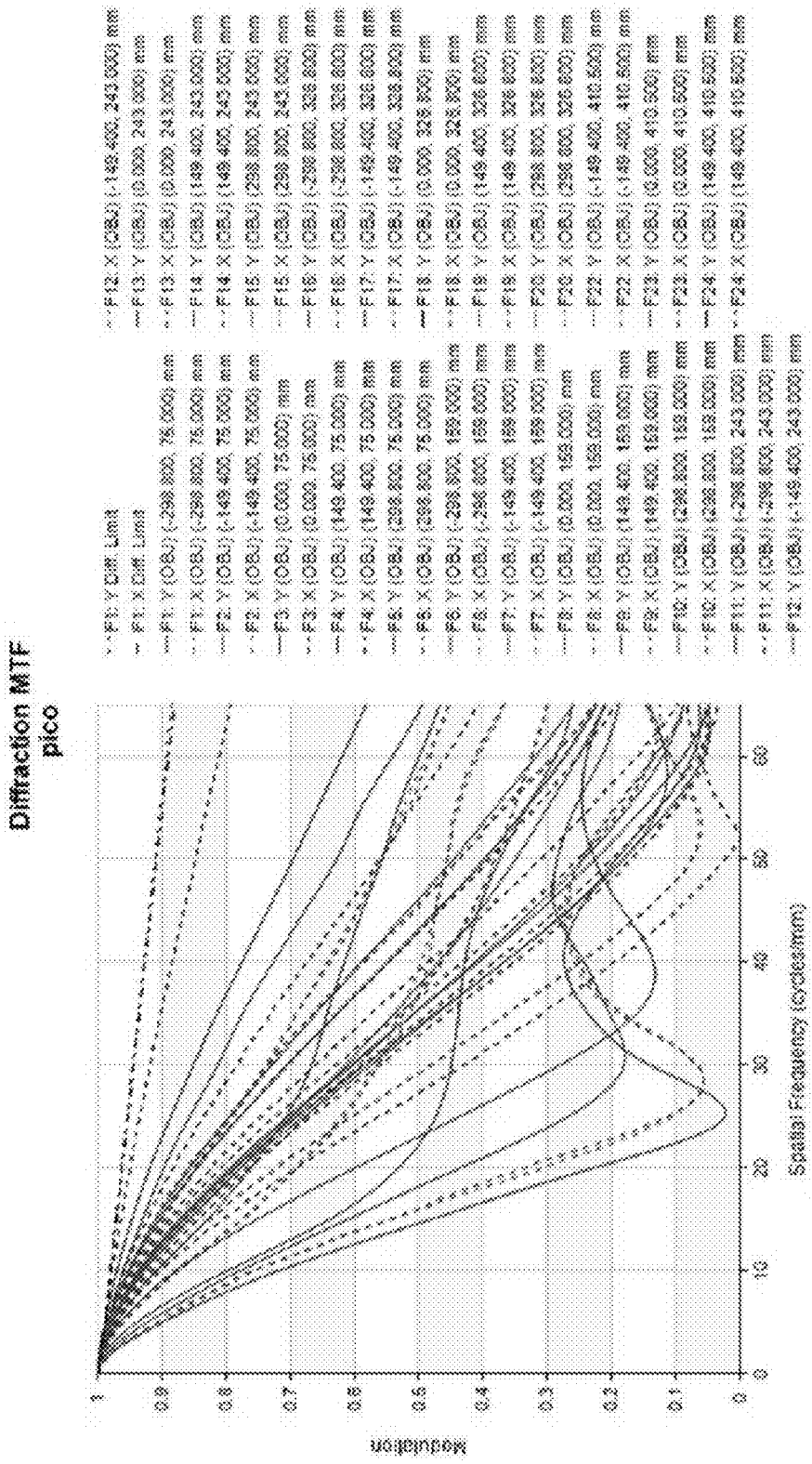
FIG. 11 is an MTF graph of a second example.
Figure 12:
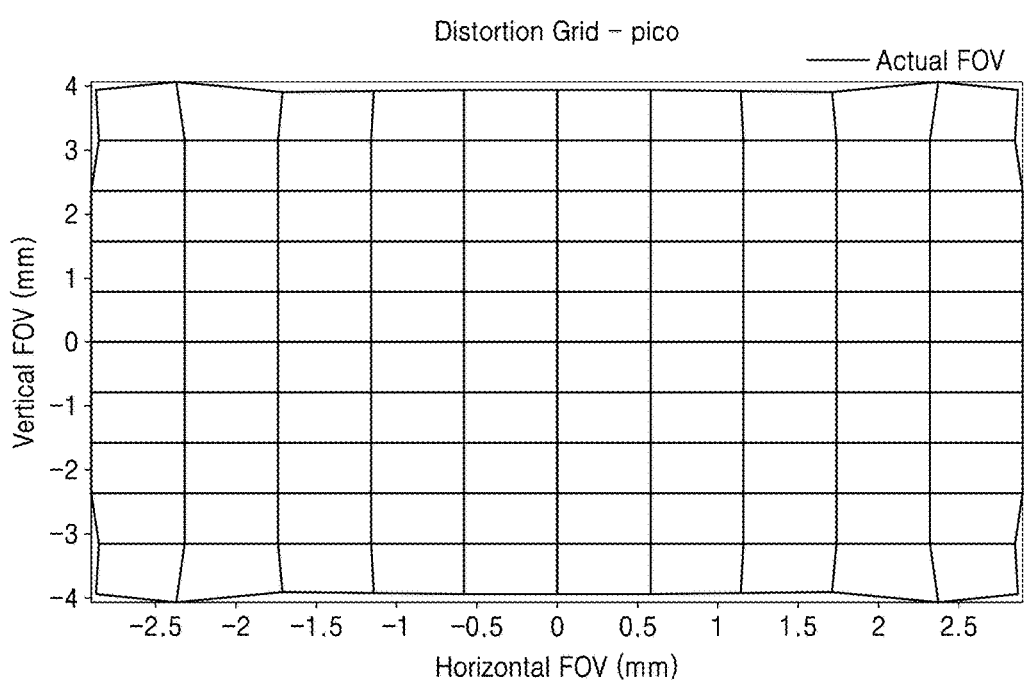
FIG. 12 is an aberration graph illustrating distortion in the second example.
Figure 13:
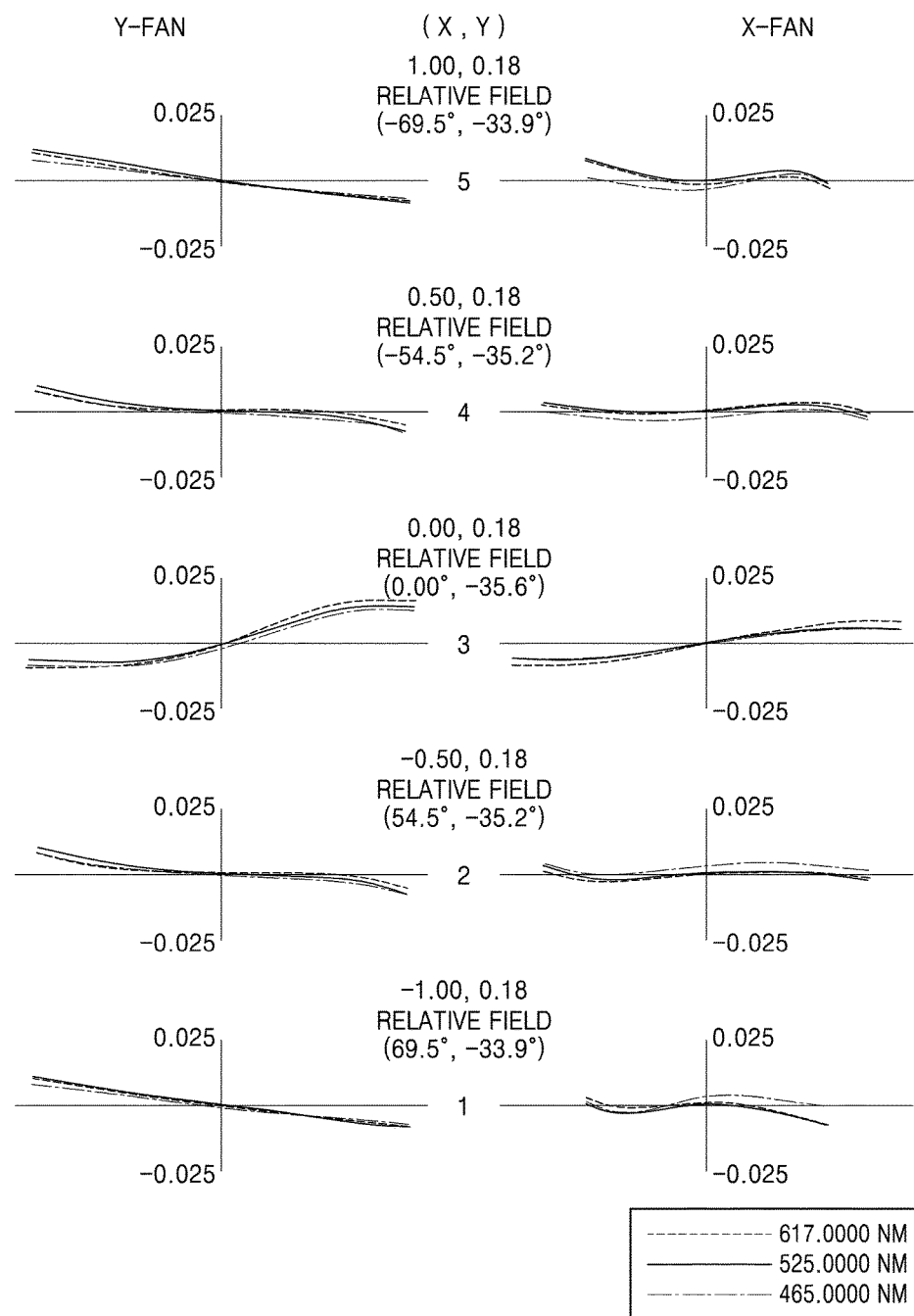
FIGS. 13, 14, 15, 16, and 17 are graphs illustrating ray aberration in each field of the projection lens system of the second example.
Figure 14:
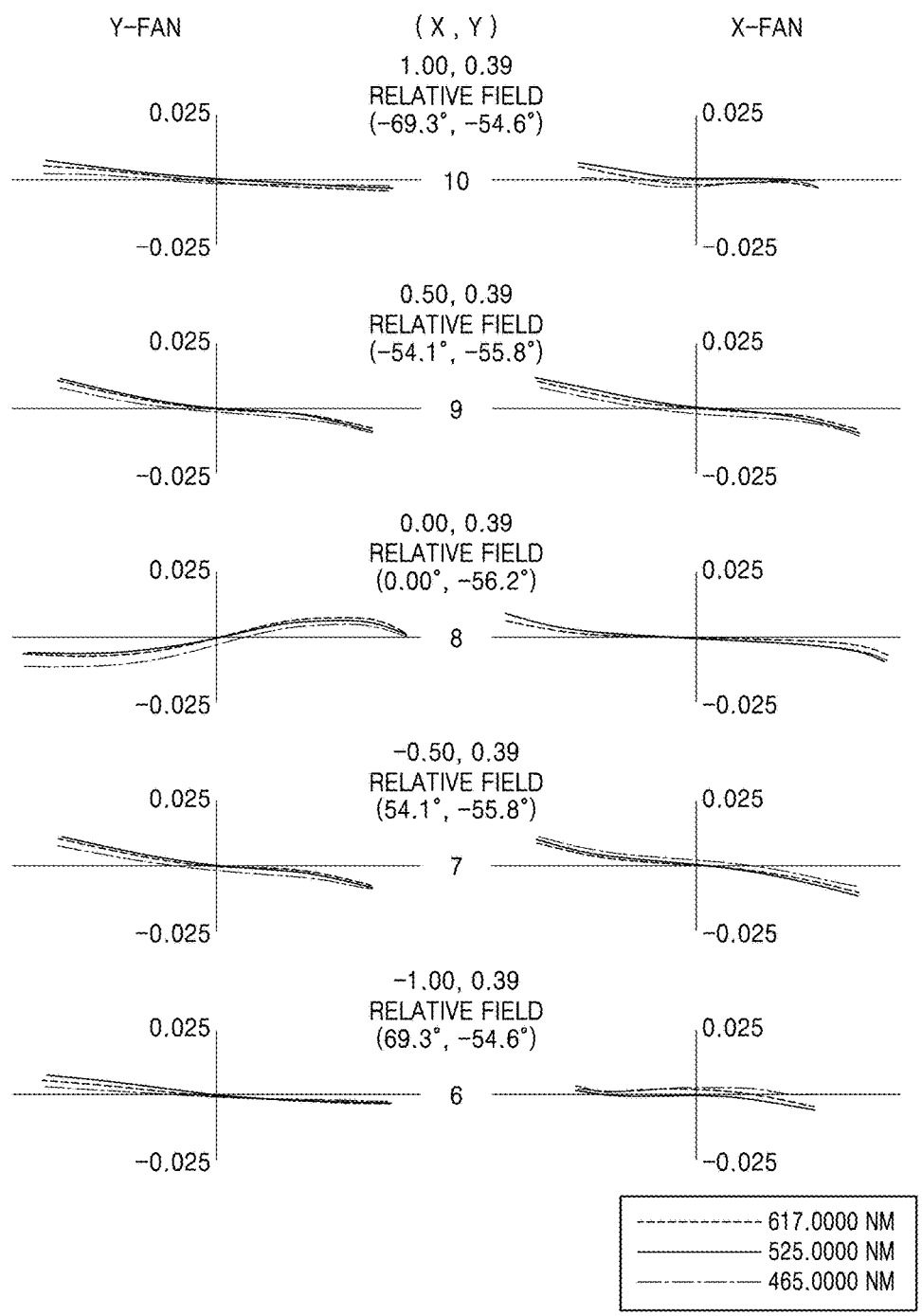
Figure 15:
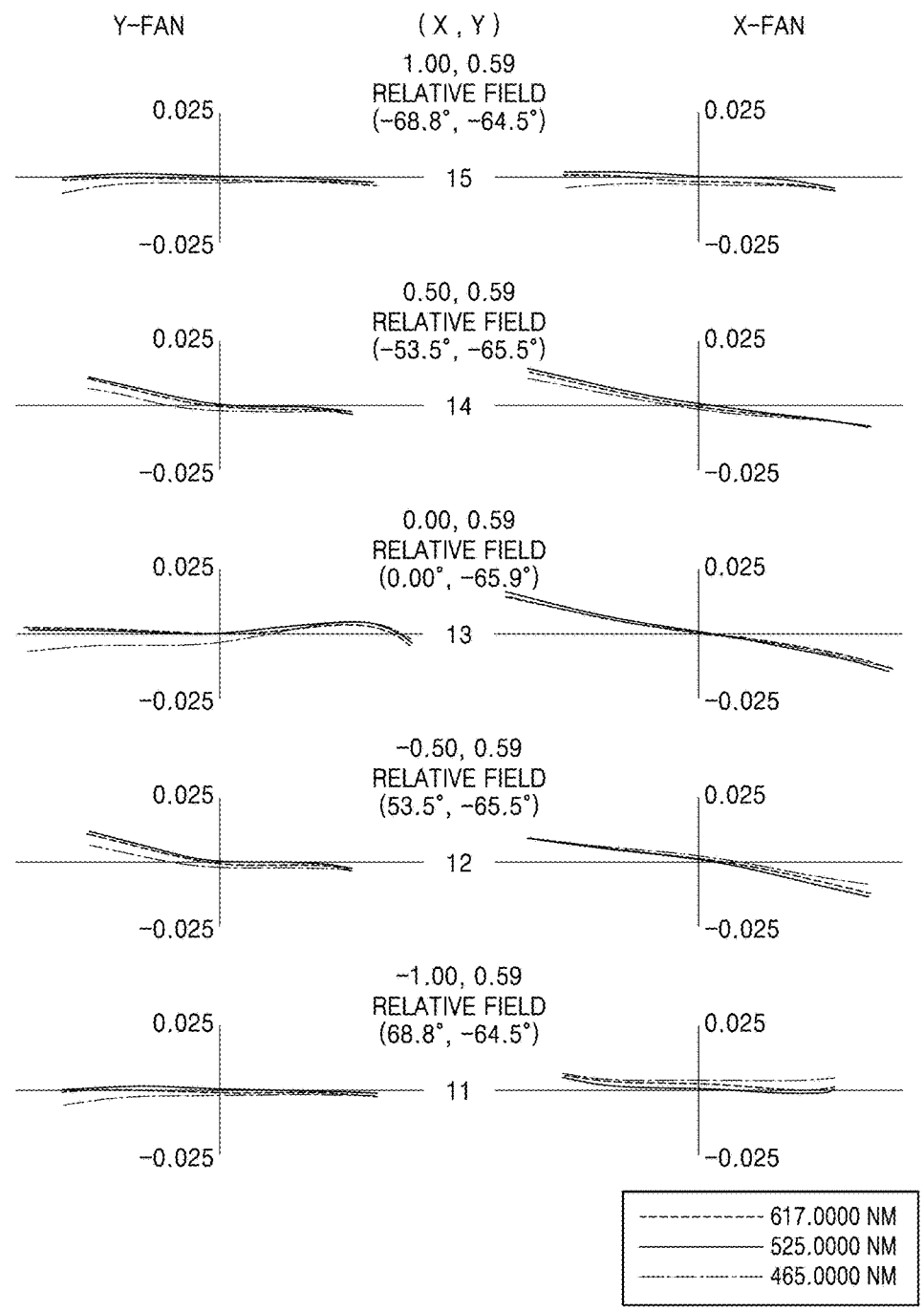
Figure 16:
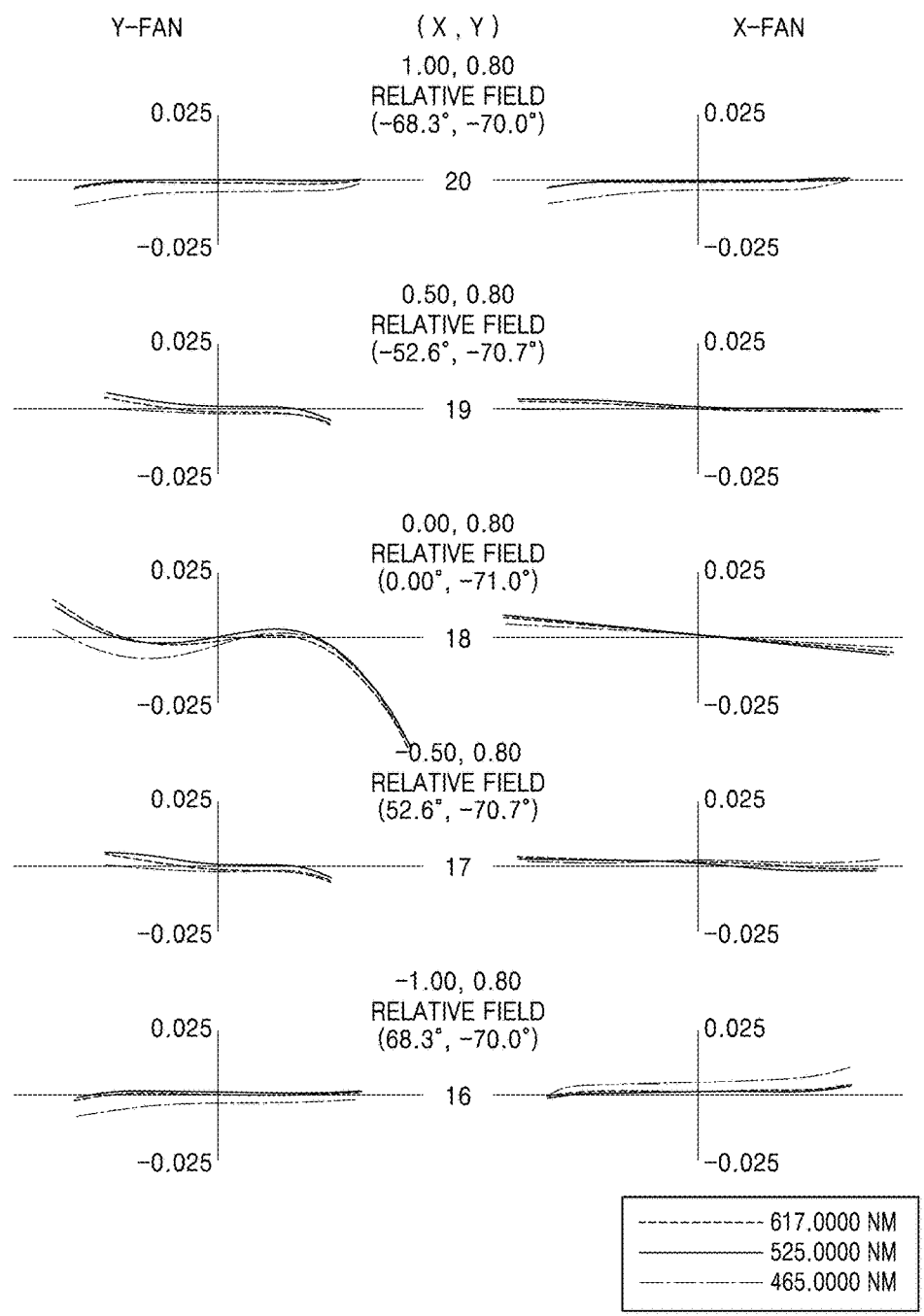
Figure 17:
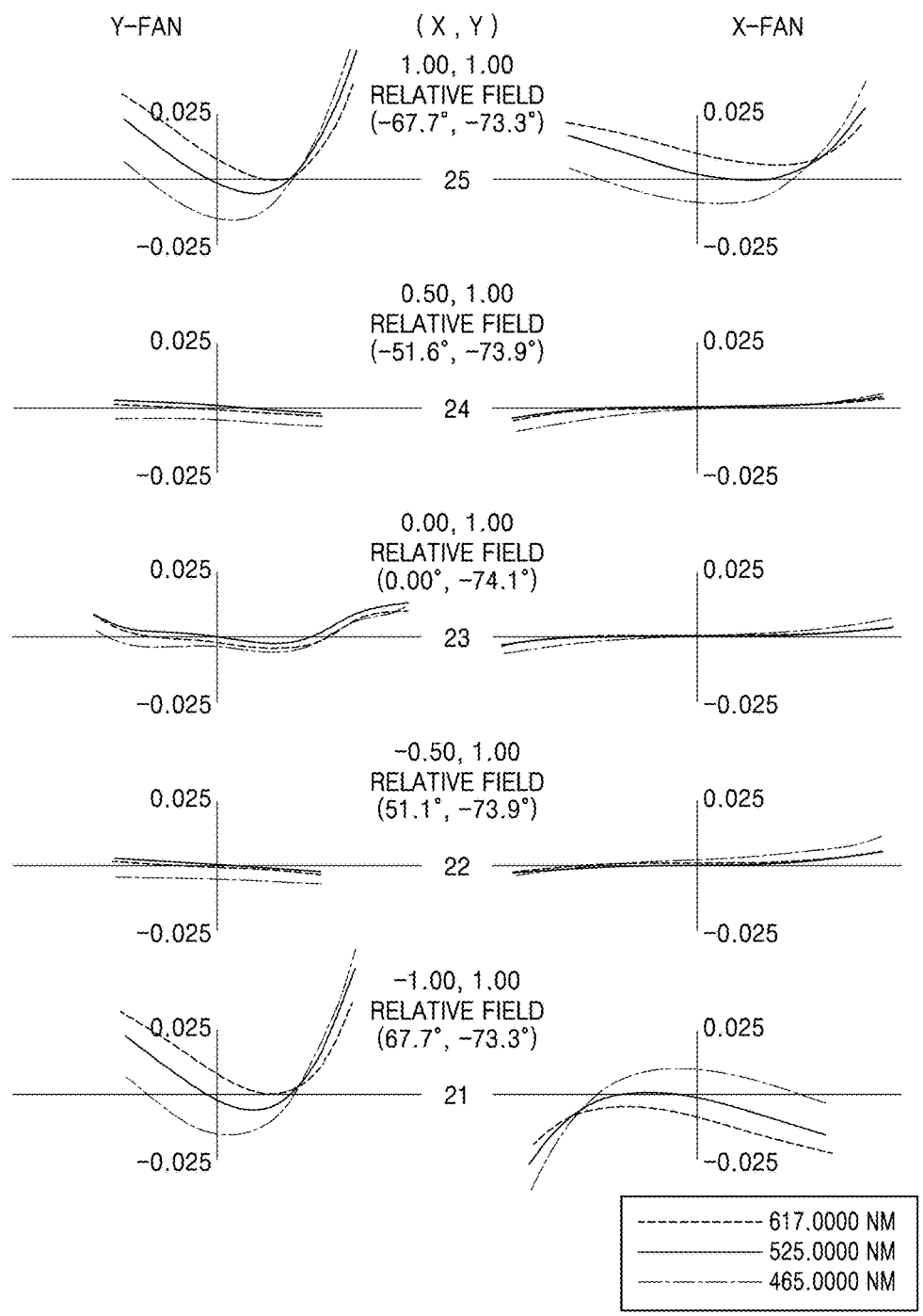

FIG. 11 is an MTF graph of a projection lens system PL of the second example, and FIG. 12 is a distortion graph of the projection lens system PL of the second example.

FIGS. 13, 14, 15, 16, and 17 illustrate ray aberration in each field of the projection lens system PL of the second example.

The projection lens system PL of the second example approximately has an ultra short focal length, and thus, although the projection lens system PL is small, the projection lens system PL may project images in a wide field of view.

THIRD EXAMPLE

Table 5 below shows design data according to a third example, according to an exemplary embodiment.

TABLE 5

| Lens surfaces | Note | Type | Radius of curvature | Thickness | Abbe number |
|---|---|---|---|---|---|
| Object surface | MDP | Sphere | Infinity | 0.71 | |
| S1 | OD | Sphere | Infinity | 0.65 | 63 |
| S2 | | Sphere | Infinity | 0.5 | |
| S3 | OC | Sphere | Infinity | 15 | 39 |
| S4 | | Sphere | Infinity | 1 | |
| S5 | | Asphere | 16.61 | 1.3 | 23 |
| S6 | | Asphere | 31.17 | 0.47 | |
| S7 | | Sphere | 52.81 | 1 | 28 |
| S8 | | Sphere | 11.15 | 0.5 | |
| S9 | | Sphere | 15.46 | 2.06 | 62 |
| S10 | | Sphere | −46.94 | 0.2 | |
| S11 | | Sphere | 12 | 2.79 | 69 |
| S12 | | Sphere | −18.85 | 0.39 | |
| S13 | | Sphere | 8.64 | 1.74 | 7 |
| S14 | | Sphere | 11.56 | 7.01 | |
| S15 | ST | Sphere | Infinity | 0.2 | |
| S16 | | Sphere | 13.48 | 1.41 | 68 |
| S17 | | Sphere | −11.37 | 0.2 | |
| S18 | | Sphere | −7.93 | 1.57 | 29 |
| S19 | | Sphere | 31.33 | 2.29 | |
| S20 | | Sphere | 94.44 | 2.78 | 28 |

TABLE 5-continued

| Lens surfaces | Note | Type | Radius of curvature | Thickness | Abbe number |
|---|---|---|---|---|---|
| S21 | | Sphere | −6.06 | 0.2 | |
| S22 | | Sphere | −5.65 | 1 | 51 |
| S23 | | Sphere | 62.17 | 3.94 | |
| S24 | | Asphere | −6.53 | 1 | 55 |
| S25 | | Asphere | −23.35 | 0.2 | |
| S26 | | Asphere | 268.24 | 2.05 | 23 |
| S27 | | Asphere | −25.29 | 23 | |
| S28 | M | Asphere | 10.78 | −101.5 | |

TABLE 5-continued

| Lens surfaces | Note | Type | Radius of curvature | Thickness | Abbe number |
|---|---|---|---|---|---|
| Image plane | SC | Sphere | Infinity | 0 | |

Table 6 below shows aspherical coefficients in the third example, according to an exemplary embodiment.

TABLE 6

| Lens | Lens surfaces | Radius of curvature | Conic Constant (K) | 4th Order Coefficient (A) | 6th Order Coefficient (B) | 8th Order Coefficient (C) | 10th Order Coefficient (D) |
|---|---|---|---|---|---|---|---|
| Aspherical mirror | S28 | 10.78 | −4.58 | −4.2458E−06 | −4.5436E−09 | 5.3131E−11 | −1.5942E−13 |
| L11 | S27 | −25.29 | −25.29 | 3.7838E+00 | −6.0169E−06 | 1.0841E−06 | −1.4324E−07 |
|  | S26 | 268.24 | 10.00 | −2.9955E−04 | 1.8843E−05 | −1.5371E−06 | 5.5704E−08 |
| L10 | S25 | −23.35 | −10.00 | −1.3707E−04 | 6.9994E−07 | −1.3766E−08 | −1.1675E−09 |
|  | S24 | −6.53 | 0.06 | 5.7596E−05 | −4.3737E−05 | 3.6417E−06 | −8.9208E−08 |
| L1 | S6 | 31.17 | 31.17 | −1.0000E+01 | 6.3146E−05 | 3.8034E−07 | −6.4563E−09 |
|  | S5 | 16.61 | −2.00 | −7.6630E−05 | 7.7626E−07 | 7.8401E−09 | 6.7501E−10 |

| Lens | Lens surfaces | 12th Order Coefficient (E) | 14th Order Coefficient (F) | 16th Order Coefficient (G) | 18th Order Coefficient (H) | 20th Order Coefficient (J) |
|---|---|---|---|---|---|---|
| Aspherical mirror | S28 | 2.6398E−16 | −2.6340E−19 | 1.5704E−22 | −5.1499E−26 | 7.1468E−30 |
| L11 | S27 | 3.5285E−09 | −2.0790E−11 | | | |
|  | S26 | −1.0006E−09 | 9.1511E−12 | −3.4208E−14 | | |
| L10 | S25 | | | | | |
|  | S24 | | | | | |
| L1 | S6 | 5.6374E−10 | | | | |
|  | S5 | | | | | |

In the third example, a first lens L1 of a front lens group G1 most adjacent to an object side O may be an aspherical lens, and two lenses of a rear lens group G2 most adjacent to an image side I may be aspherical lenses.

Figure 18:
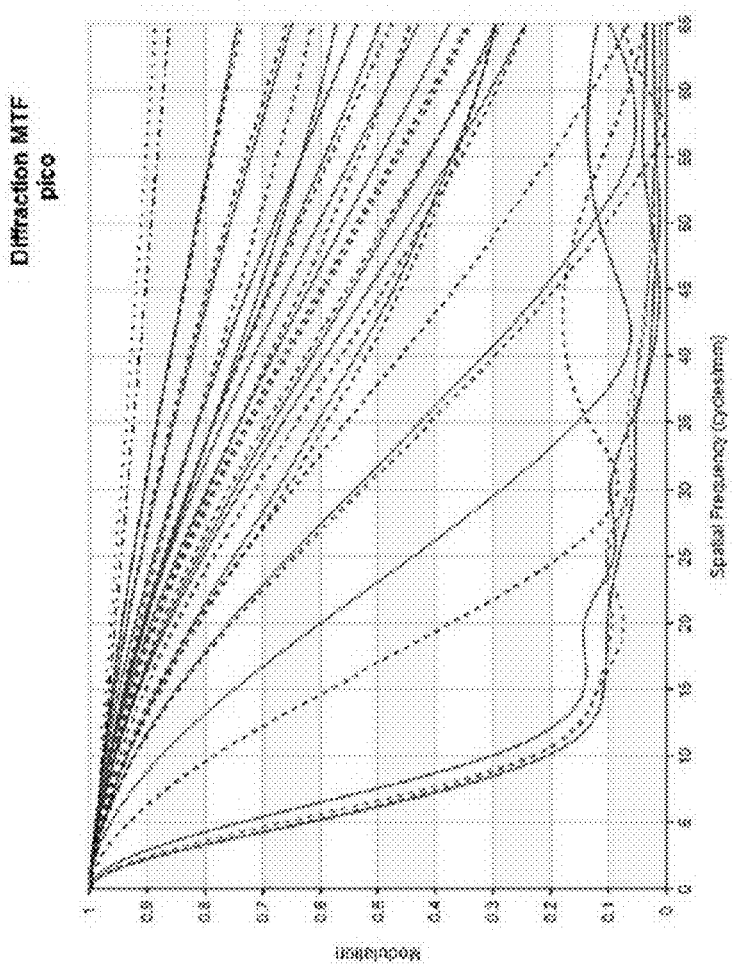
FIG. 18 is an MTF graph of a third example.
Figure 19:
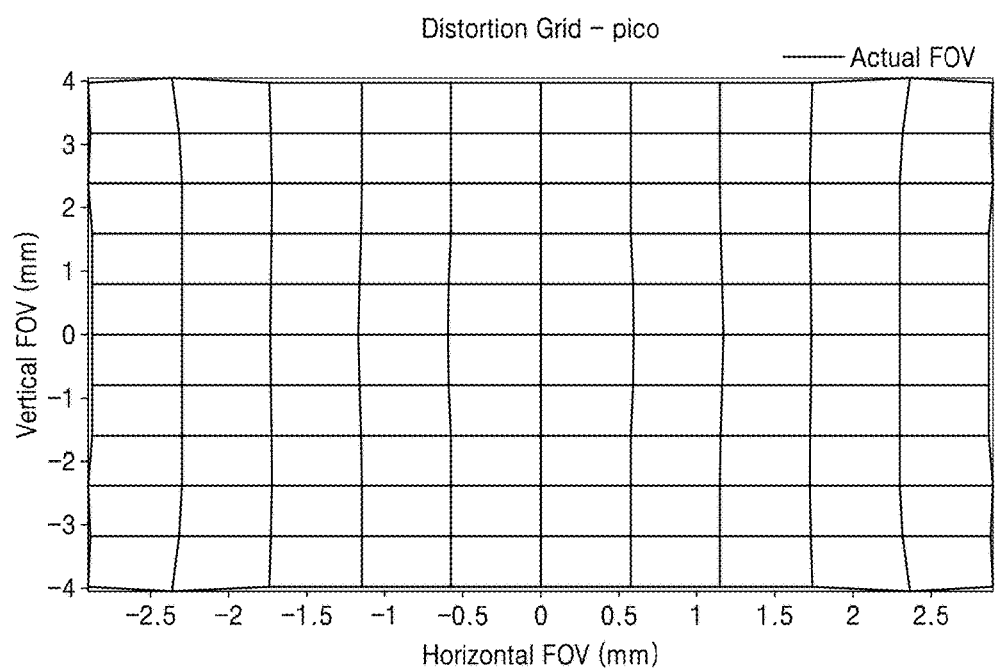
FIG. 19 is an aberration graph illustrating distortion in the third example.
Figure 20:
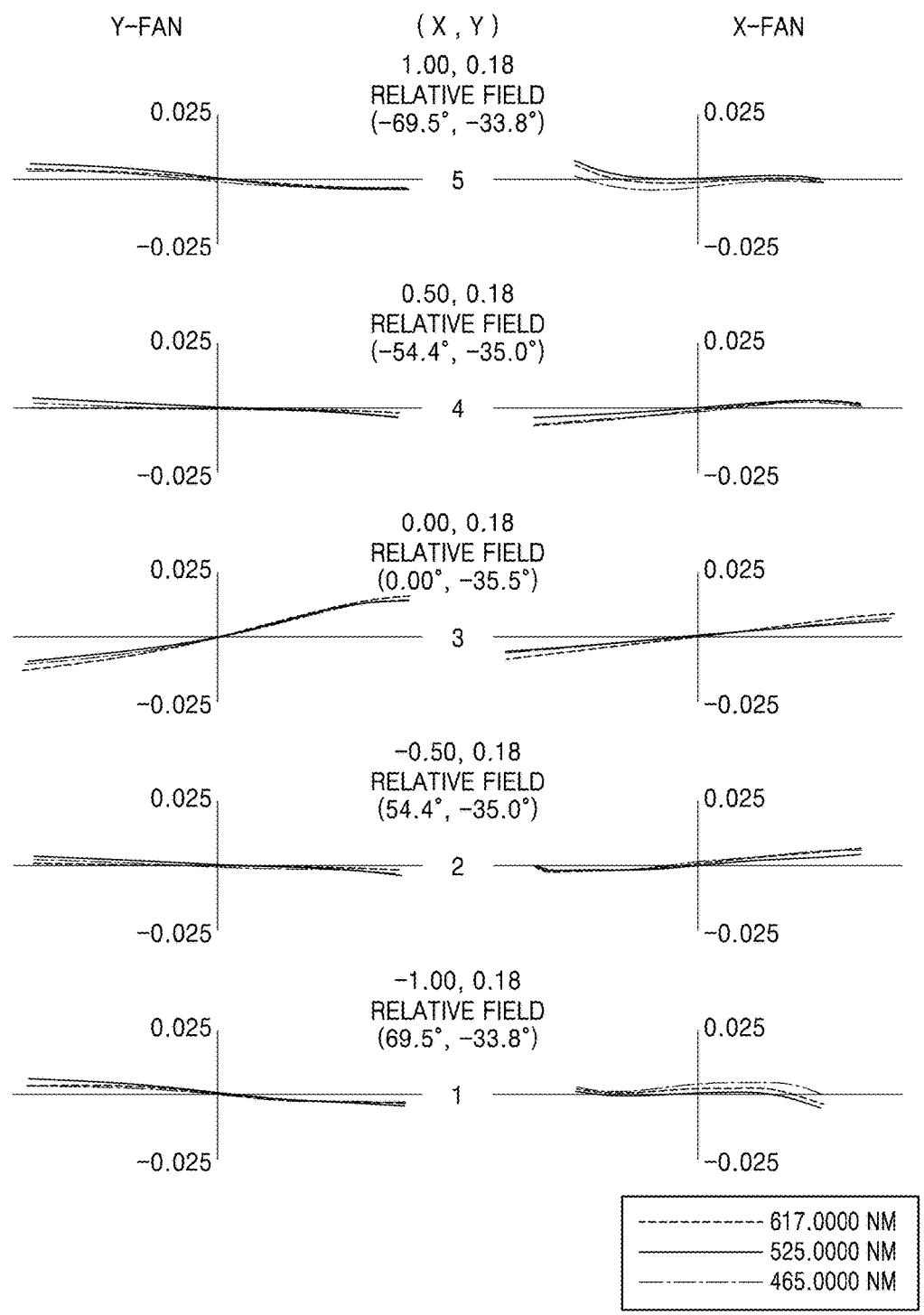
FIGS. 20, 21, 22, 23, and 24 are graphs illustrating ray aberration in each field of the projection lens system of the third example.
Figure 21:
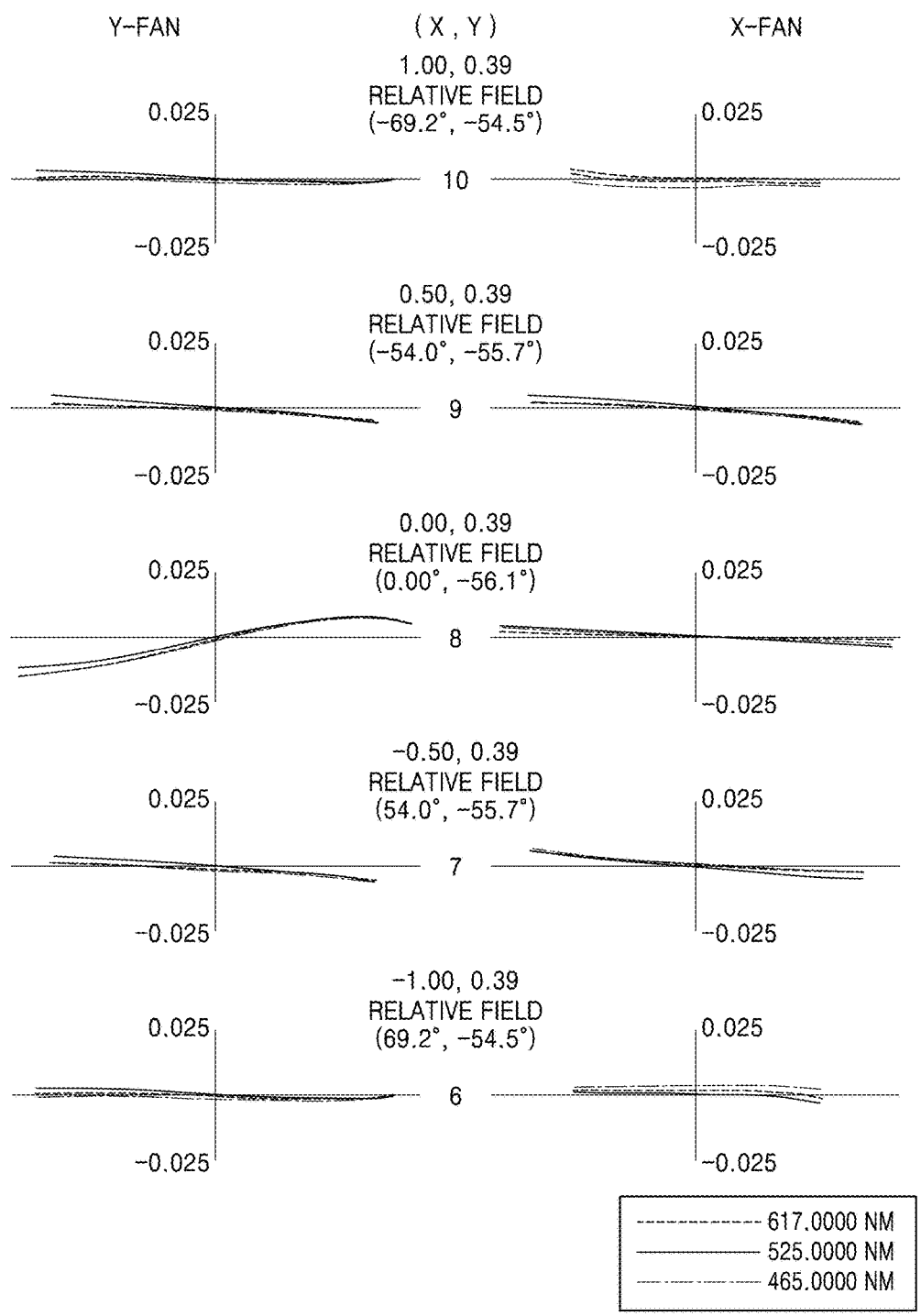
Figure 22:
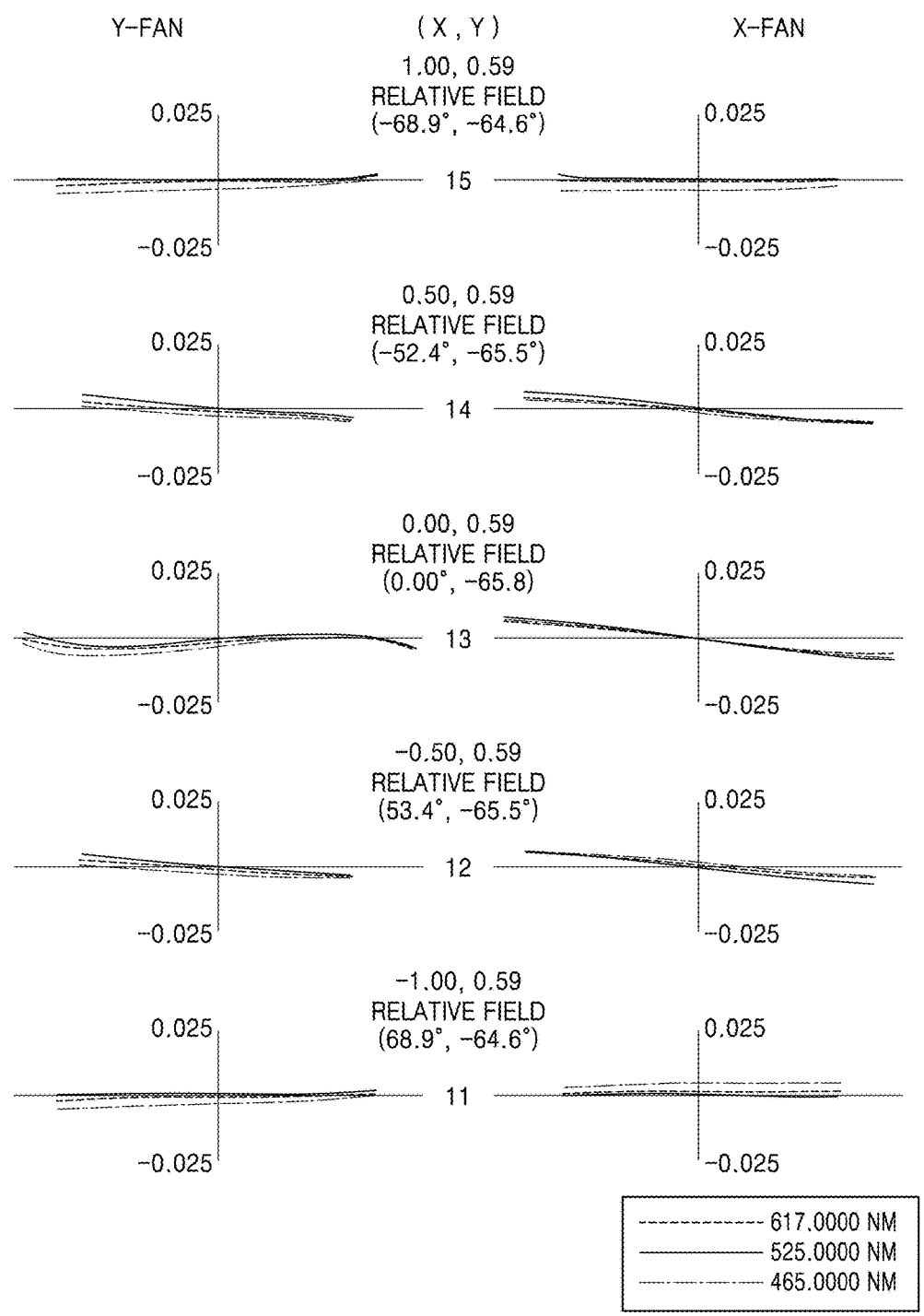
Figure 23:
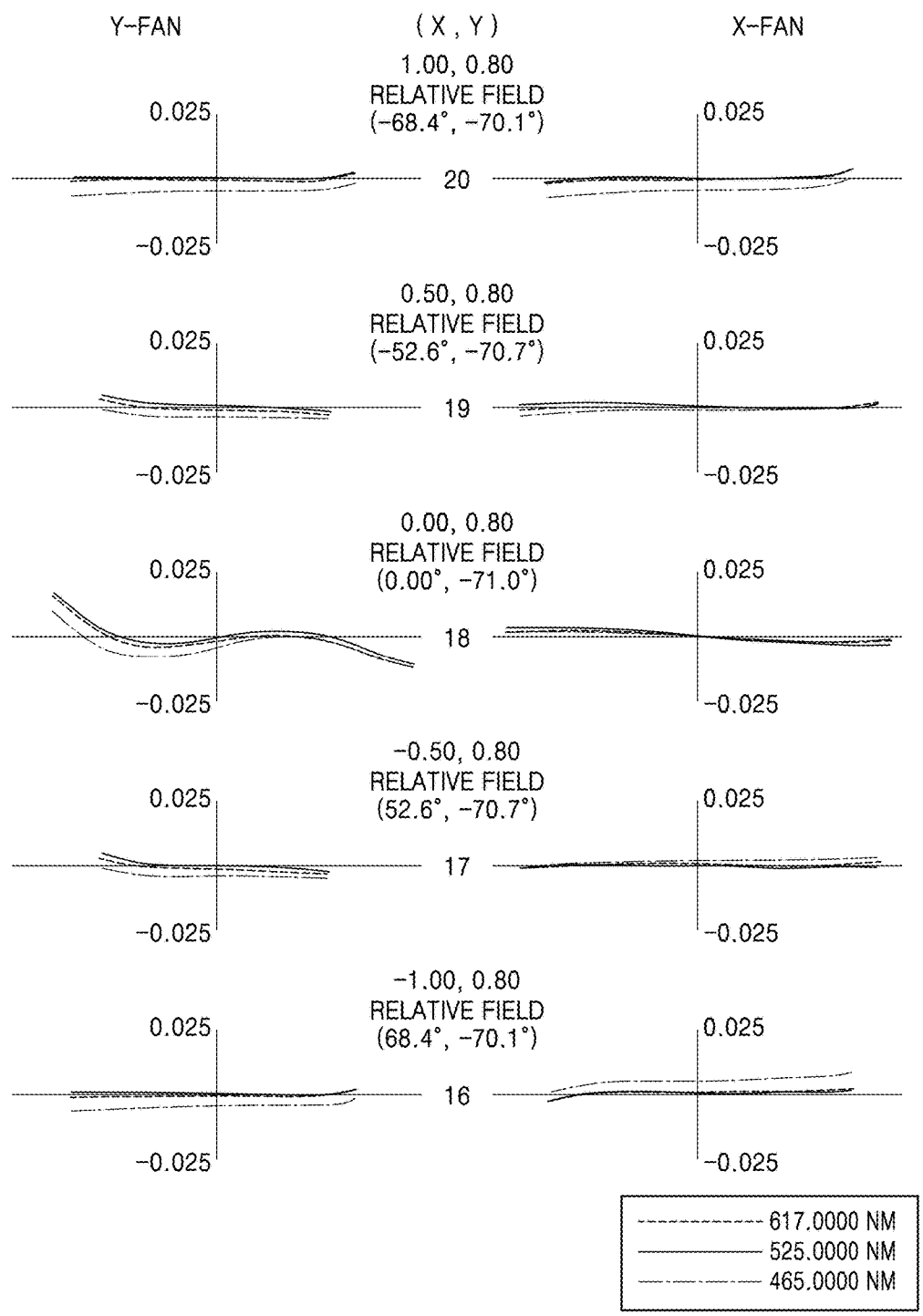
Figure 24:
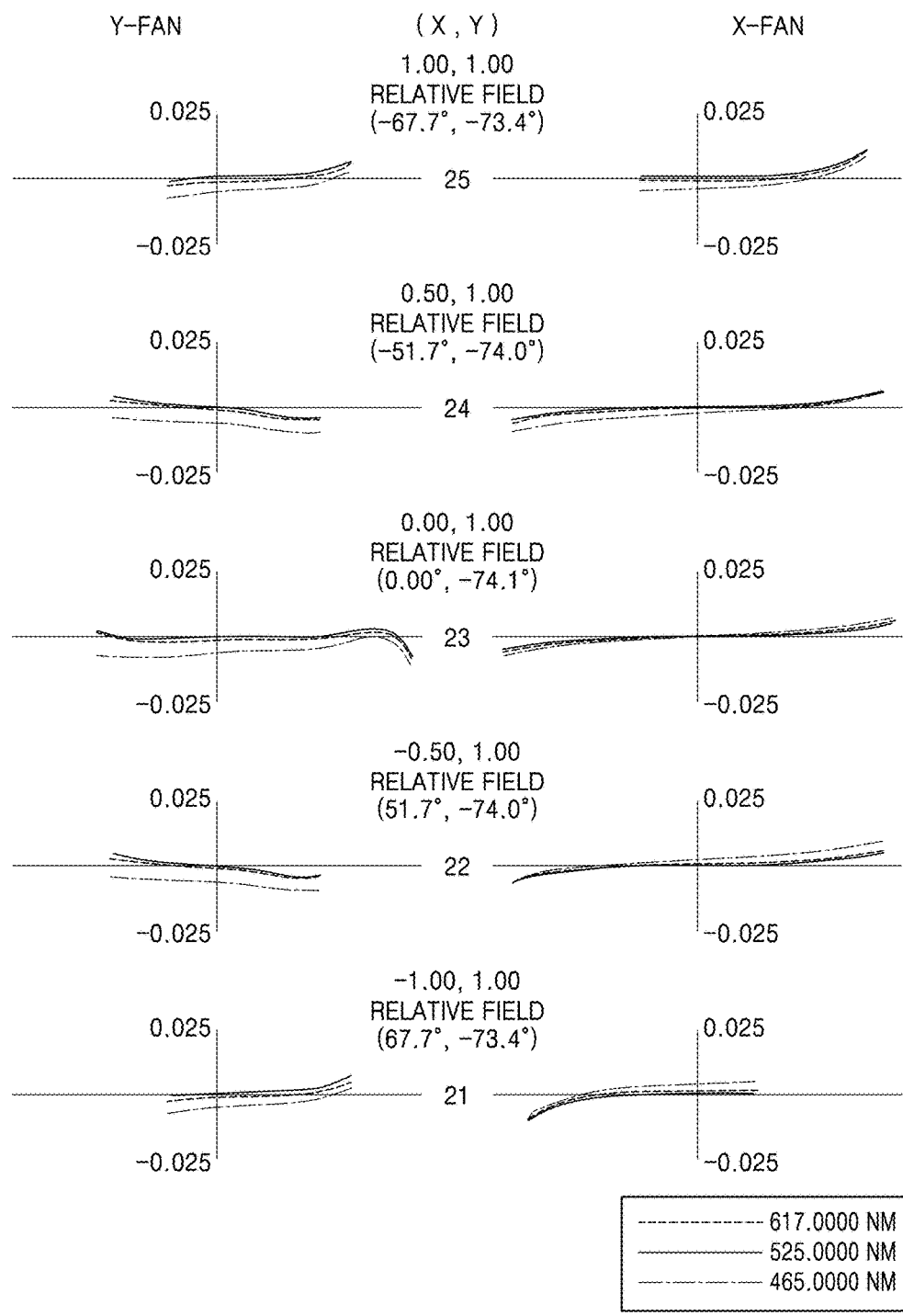

FIG. 18 is an MTF graph of a projection lens system PL of the third example, and FIG. 19 is a distortion graph of the projection lens system PL of the third example.

FIGS. 20, 21, 22, 23, and 24 illustrate ray aberration in each field of the projection lens system PL of the third example.

The projection lens system PL of the third example has an ultra short focal length, and thus, although the projection lens system PL is small, the projection lens system PL may project images in a wide field of view.

FOURTH EXAMPLE

Table 7 below shows design data according to a fourth example, according to an exemplary embodiment.

TABLE 7

| Lens surfaces | Note | Type | Radius of curvature | Thickness | Abbe number |
|---|---|---|---|---|---|
| Object surface | MDP | Sphere | Infinity | 0.71 | |
| S1 | OD | Sphere | Infinity | 0.65 | 631 |
| S2 | | Sphere | Infinity | 0.50 | |
| S3 | OC | Sphere | Infinity | 15.00 | 392 |
| S4 | | Sphere | Infinity | 1.00 | |
| S5 | | Sphere | 16.89 | 2.39 | 603 |
| S6 | | Sphere | −42.25 | 0.20 | |
| S7 | | Sphere | 22.37 | 1.00 | 275 |
| S8 | | Sphere | 9.27 | 0.86 | |
| S9 | | Sphere | 18.02 | 1.38 | 608 |
| S10 | | Sphere | 33.64 | 0.20 | |
| S11 | | Sphere | 9.09 | 2.65 | 816 |
| S12 | | Sphere | −84.51 | 0.20 | |
| S13 | | Asphere | 9.36 | 1.61 | 704 |
| S14 | | Asphere | 13.93 | 6.41 | |
| S15 | ST | Sphere | Infinity | 1.69 | |
| S16 | | Sphere | 9.61 | 1.76 | 704 |
| S17 | | Sphere | 15.80 | 0.48 | |
| S18 | | Sphere | 44.64 | 2.63 | 488 |
| S19 | | Sphere | −28.70 | 1.00 | |
| S20 | | Sphere | −7.54 | 1.29 | 278 |
| S21 | | Sphere | −6.40 | 0.44 | |
| S22 | | Sphere | −7.31 | 1.68 | 449 |
| S23 | | Sphere | −65.77 | 1.48 | |
| S24 | | Asphere | −6.94 | 1.97 | 581 |
| S25 | | Asphere | −19.14 | 1.61 | |
| S26 | | Asphere | −336.58 | 2.06 | 23 |
| S27 | | Asphere | −24.39 | 23.00 | |
| S28 | M | Asphere | 10.44 | −101.5 | |
| Image plane | SC | Sphere | Infinity | 0 | |

Table 8 below shows aspherical coefficients in the fourth example, according to an exemplary embodiment.

TABLE 8

| | | Y Radius | Conic Constant (K) | 4th Order Coefficient (A) | 6th Order Coefficient (B) | 8th Order Coefficient (C) | 10th Order Coefficient (D) |
|---|---|---|---|---|---|---|---|
| Aspherical mirror | S28 | 10.44 | −4.52 | −4.5036E−06 | −4.2266E−09 | 5.3137E−11 | −1.5953E−13 |
| L11 | S27 | −24.39 | 4.12 | 8.9883E−06 | 8.0378E−07 | −1.4655E−07 | 3.4677E−09 |
|  | S26 | −336.58 | 10.00 | −2.2175E−04 | 1.8789E−06 | −1.5391E−06 | 5.5519E−08 |
| L10 | S25 | −19.14 | −10.00 | −4.8803E−06 | −6.3842E−07 | −1.5533E−07 | 1.2294E−09 |
|  | S24 | −6.94 | 0.47 | −1.9214E−04 | −2.2537E−05 | 1.8350E−06 | −1.6083E−07 |
| L5 | S14 | 13.93 | 1.28 | 6.2654E−05 | −6.1998E−07 | 8.0109E−08 | 5.0005E−09 |
|  | S13 | 9.36 | −0.27 | −6.0843E−05 | −1.4278E−06 | 2.8099E−08 | 2.1468E−09 |

| | | 12th Order Coefficient (E) | 14th Order Coefficient (F) | 16th Order Coefficient (G) | 18th Order Coefficient (H) | 20th Order Coefficient (J) |
|---|---|---|---|---|---|---|
| Aspherical mirror | S28 | 2.6398E−16 | −2.6342E−19 | 1.5706E−22 | −5.1469E−26 | 7.1281E−30 |
| L11 | S27 | −2.0790E−11 | −3.4085E−37 | −3.4085E−37 | | |
|  | S26 | −1.0006E−09 | 9.1511E−12 | −3.4208E−14 | | |
| L10 | S25 | −7.0360E−35 | −3.4085E−37 | | | |
|  | S24 | −7.0360E−35 | −3.4085E−37 | | | |
| L5 | S14 | 2.4307E−35 | | | | |
|  | S13 | 2.4307E−35 | | | | |

In the fourth example, a fifth lens L5 of a front lens group G1 most adjacent to an image side I may be an aspherical lens, and two lenses of a rear lens group G2 most adjacent to the image side I may be aspherical lenses.

Figure 25:
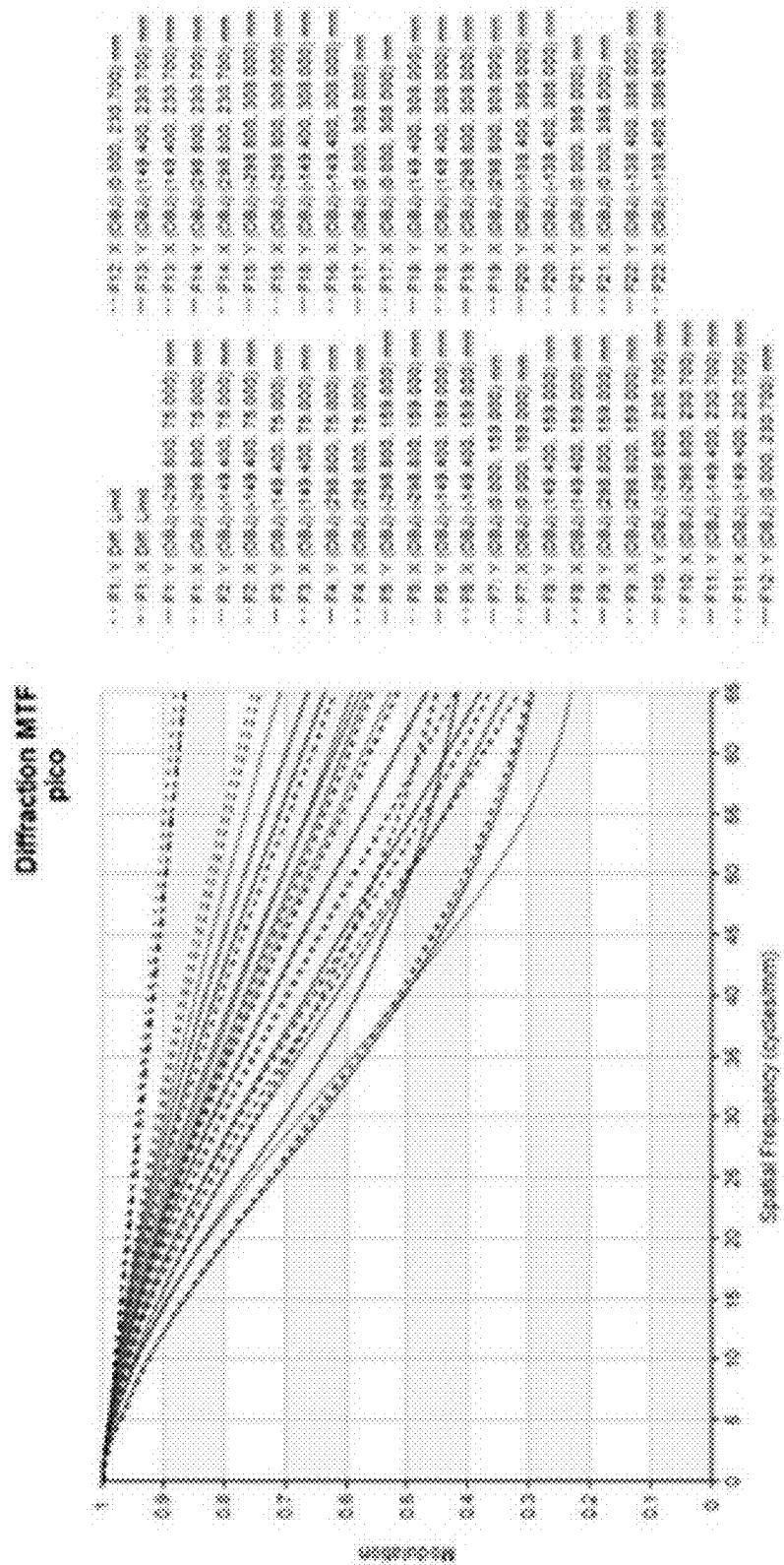
FIG. 25 is an MTF graph of a fourth example.
Figure 26:
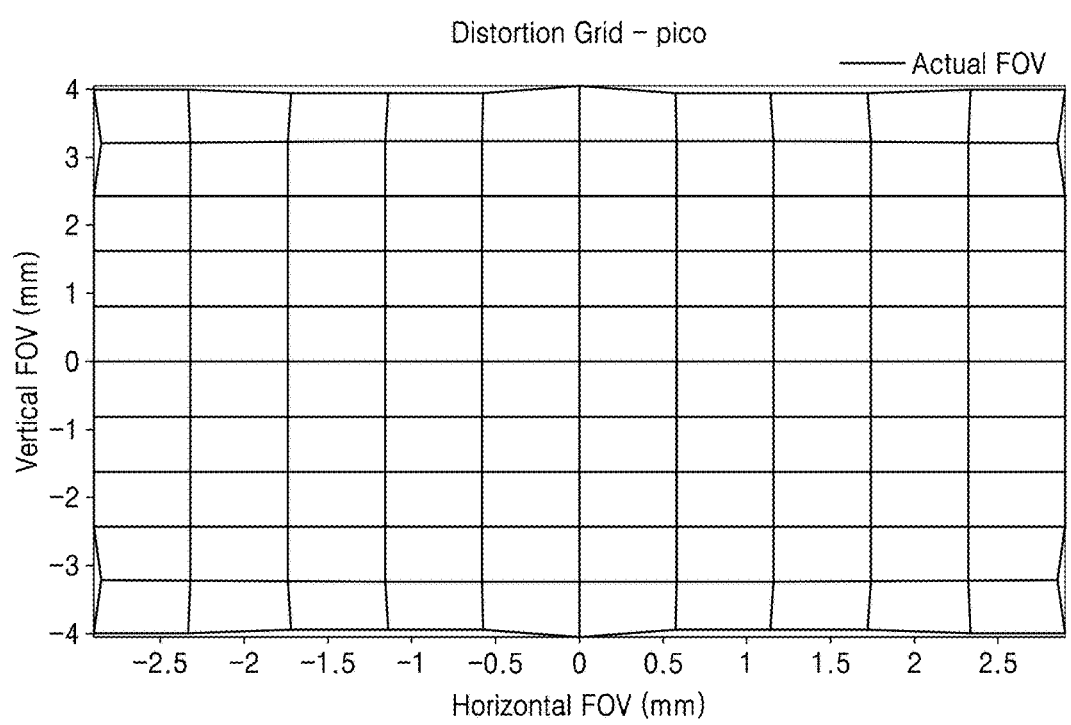
FIG. 26 is an aberration graph illustrating distortion in the fourth example.
Figure 27:
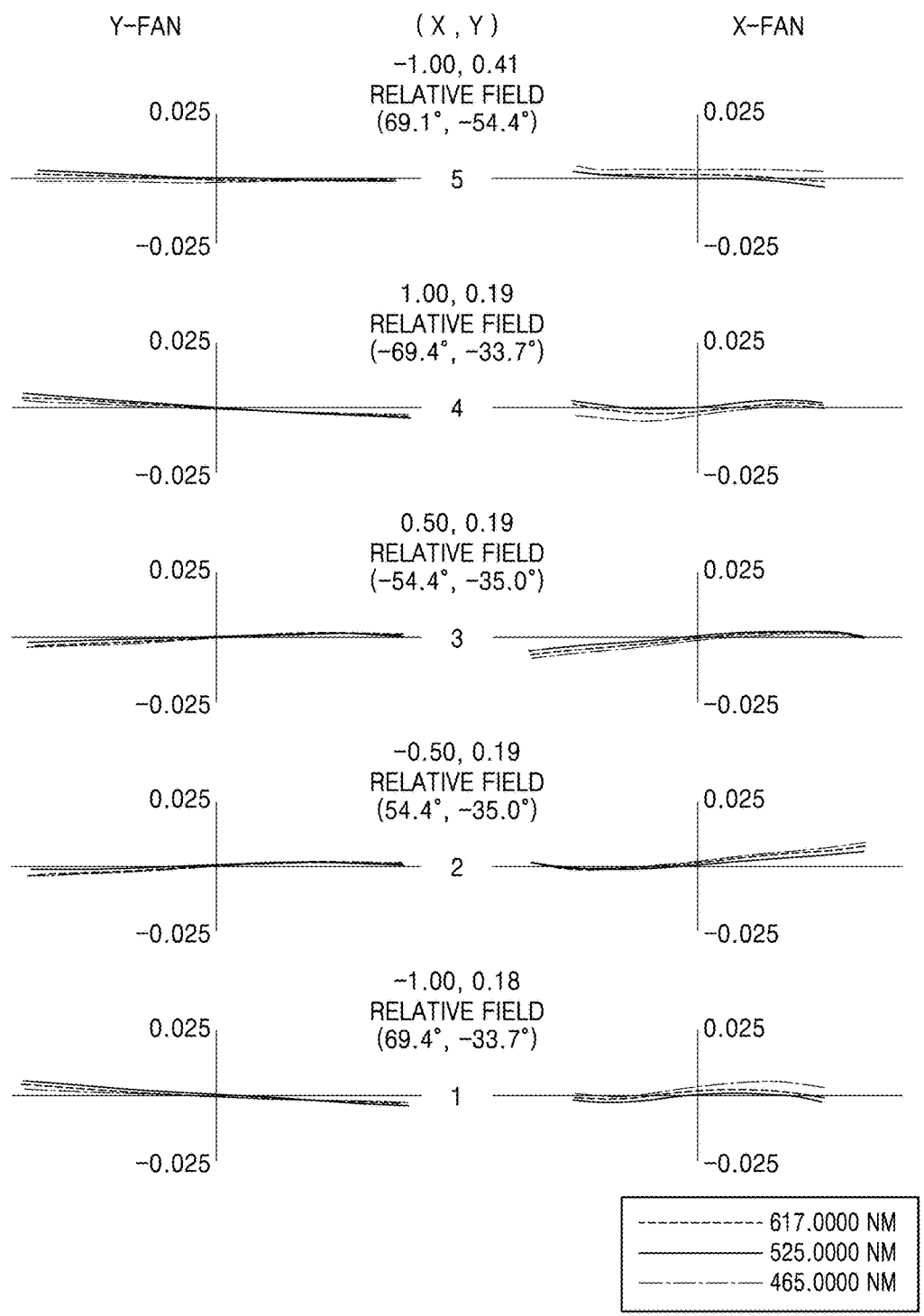
FIGS. 27, 28, 29, 30, and 31 are graphs illustrating ray aberration in each field of the projection lens system of the fourth example.
Figure 28:
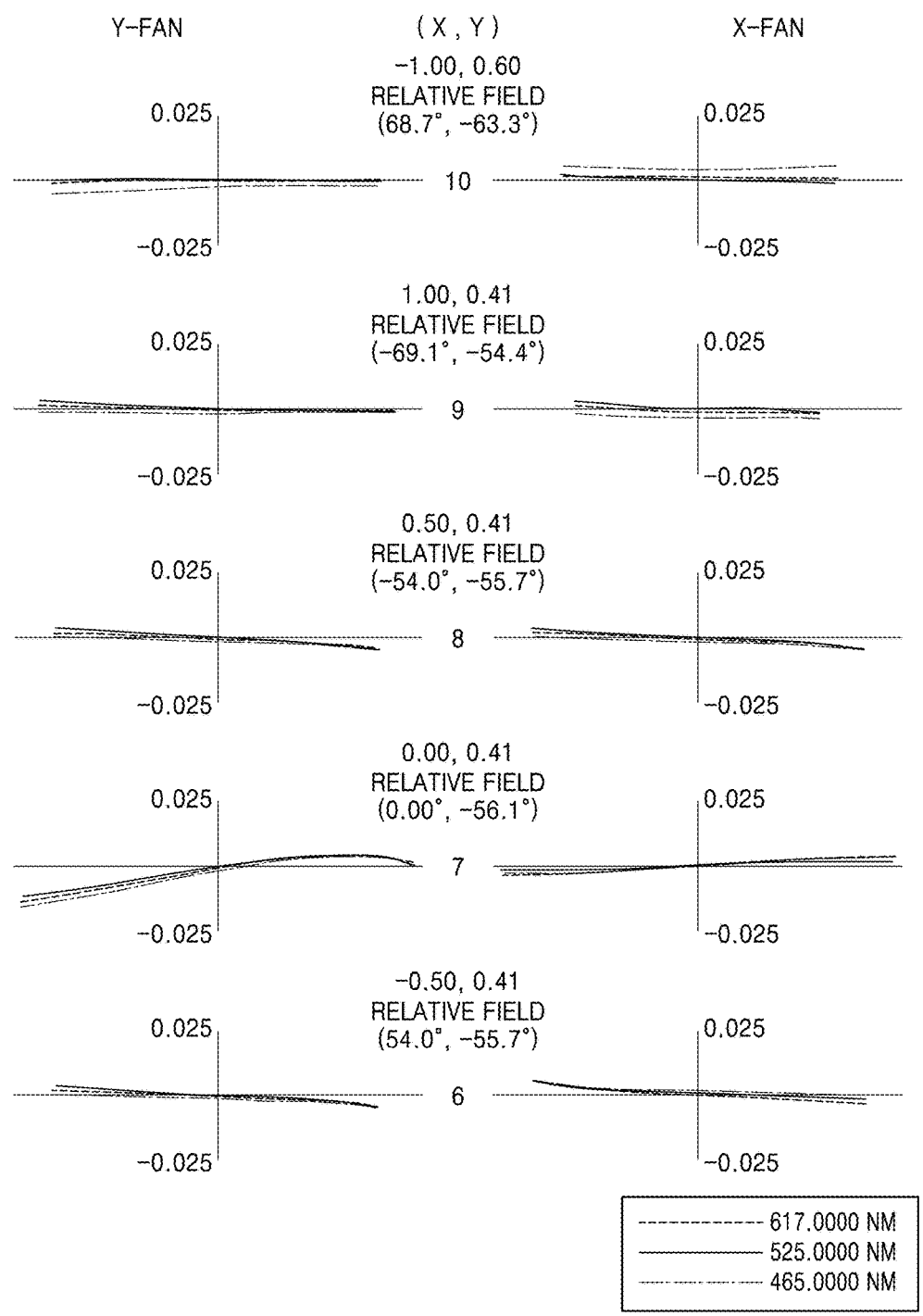
Figure 29:
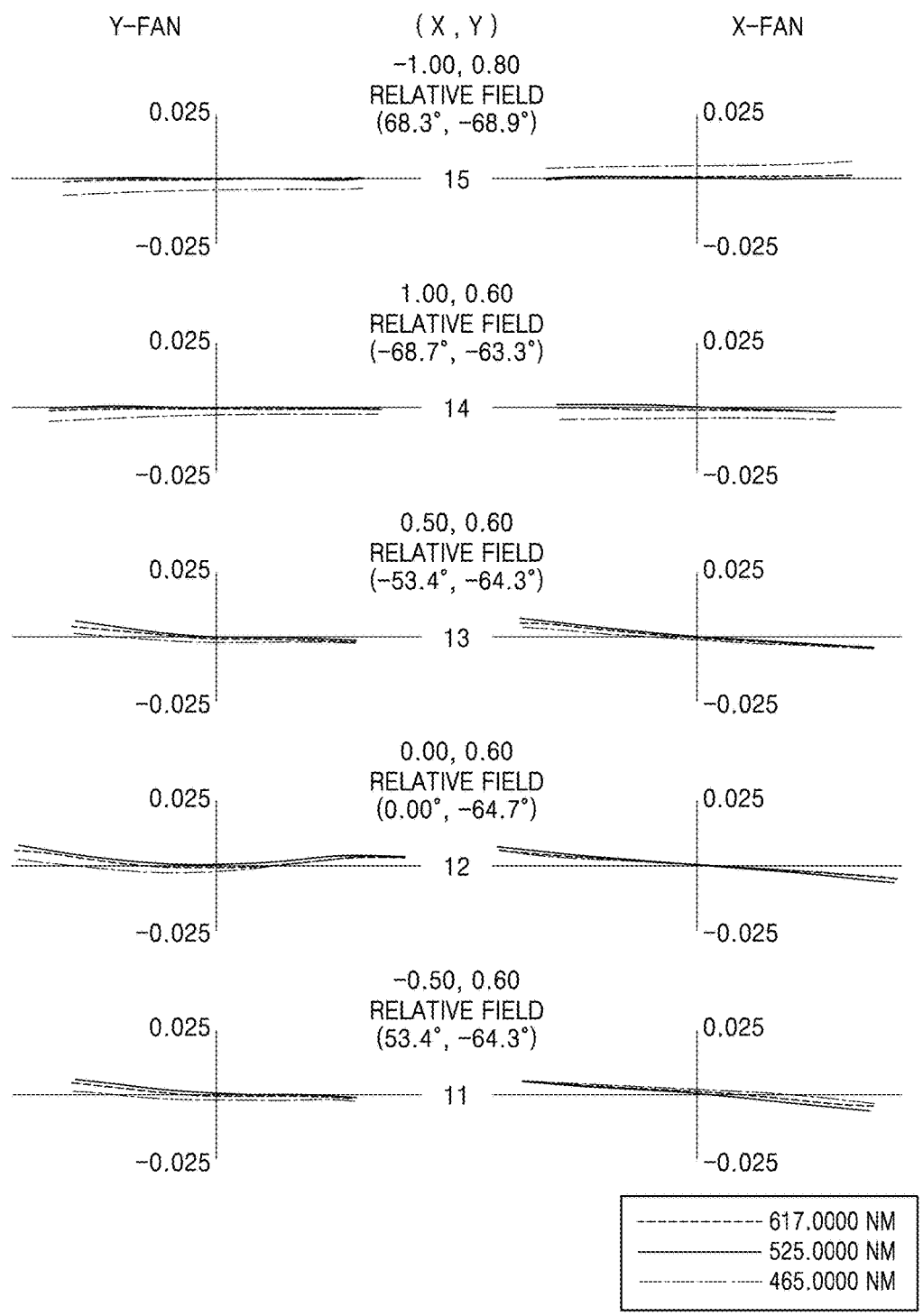
Figure 30:
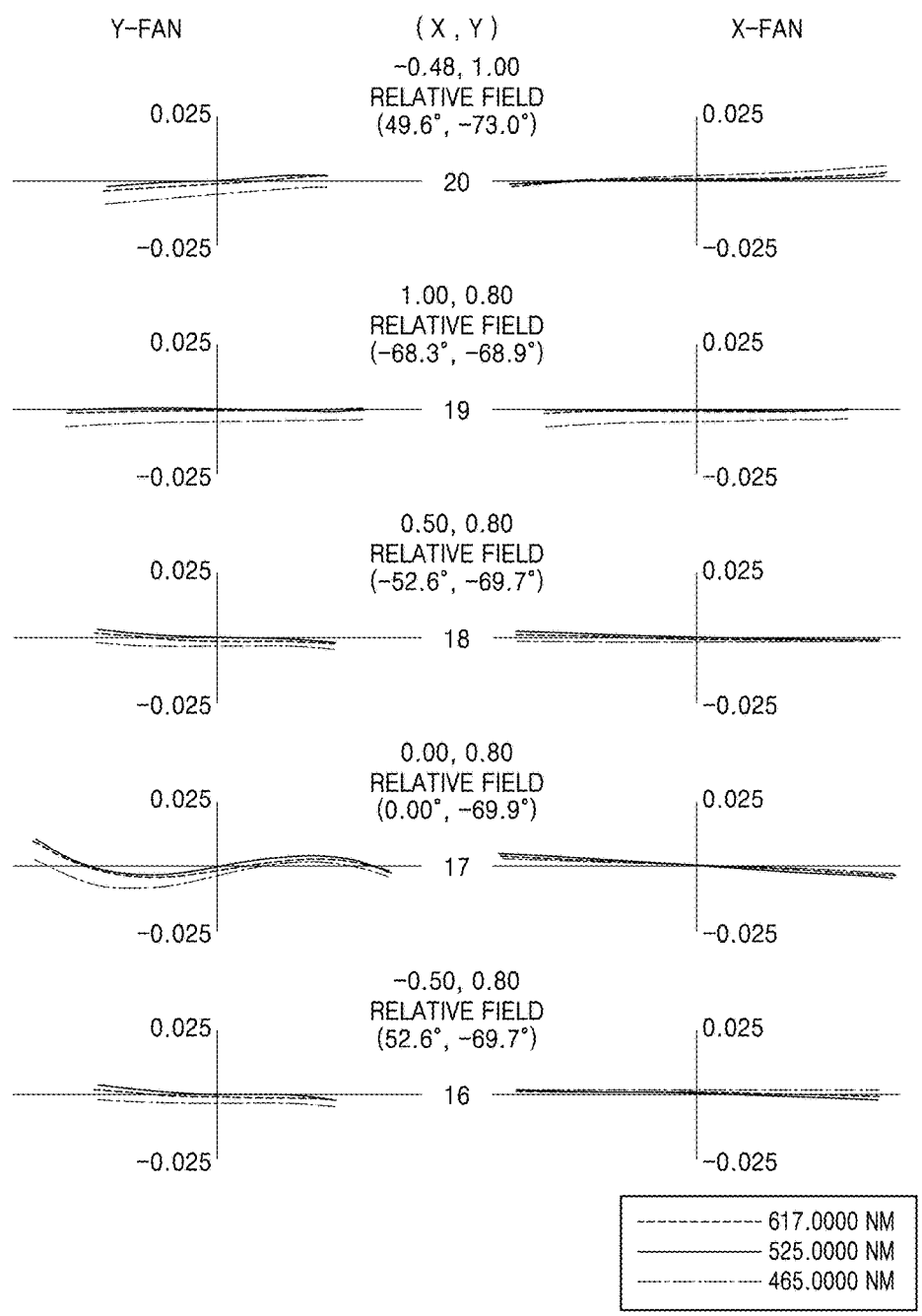
Figure 31:
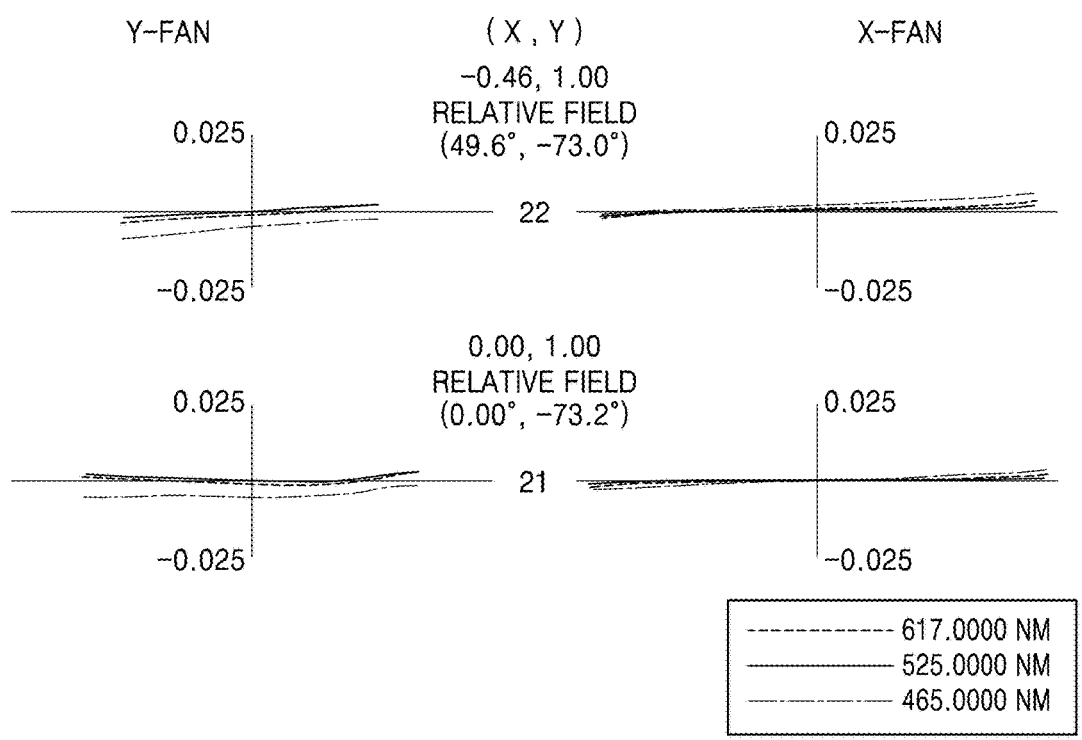

FIG. 25 is an MTF graph of a projection lens system PL of the fourth example, and FIG. 26 is a distortion graph of the projection lens system PL of the fourth example.

FIGS. 27, 28, 29, 30, and 31 illustrate ray aberration in each field of the projection lens system PL of the fourth example.

The projection lens system PL of the fourth example has an ultra short focal length, and thus, although the projection lens system PL is small, the projection lens system PL may project images in a wide field of view. In addition, the projection lens system PL of the fourth example may have a low throw ratio RT and a high resolution (that is, MTF), and thus images may not be distorted even though the projection distance of the projection lens system PL is short.

FIFTH EXAMPLE

Table 9 below shows design data according to a fifth example, according to an exemplary embodiment.

TABLE 9

| Lens surfaces | Note | Type | Radius of curvature | Thickness | Abbe number |
|---|---|---|---|---|---|
| Object surface | MDP | Sphere | Infinity | 0.71 | |

TABLE 9-continued

| Lens surfaces | Note | Type | Radius of curvature | Thickness | Abbe number |
|---|---|---|---|---|---|
| S1 | OD | Sphere | Infinity | 0.65 | 63.1 |
| S2 | | Sphere | Infinity | 0.50 | |
| S3 | OC | Sphere | Infinity | 15.00 | 39.2 |
| S4 | | Sphere | Infinity | 1.00 | |
| S5 | | Sphere | 17.47 | 2.32 | 60.3 |
| S6 | | Sphere | −40.64 | 0.20 | |
| S7 | | Sphere | 21.84 | 1.00 | 27.5 |
| S8 | | Sphere | 9.25 | 0.82 | |
| S9 | | Sphere | 17.83 | 1.32 | 60.8 |
| S10 | | Sphere | 31.60 | 0.20 | |
| S11 | | Sphere | 8.84 | 2.64 | 81.6 |
| S12 | | Sphere | −83.99 | 0.20 | |
| S13 | | Asphere | 8.89 | 1.62 | 70.4 |
| S14 | | Asphere | 12.79 | 6.32 | |
| S15 | ST | Sphere | Infinity | 1.98 | |
| S16 | | Sphere | 9.76 | 1.75 | 70.4 |
| S17 | | Sphere | 15.93 | 0.55 | |
| S18 | | Sphere | 45.92 | 2.59 | 48.8 |
| S19 | | Sphere | −24.92 | 1.00 | |
| S20 | | Sphere | −6.97 | 1.30 | 27.7 |
| S21 | | Sphere | −6.12 | 0.43 | |
| S22 | | Sphere | −7.06 | 1.00 | 44.9 |
| S23 | | Sphere | −66.53 | 1.37 | |
| S24 | | Asphere | −7.04 | 1.87 | 58.1 |
| S25 | | Asphere | −19.10 | 1.75 | |
| S26 | | Asphere | −1242.15 | 2.09 | 23 |
| S27 | | Asphere | −24.65 | 23.00 | |
| S28 | M | Asphere | 10.54 | −101.50 | |
| Image plane | SC | Sphere | Infinity | 0 | |

Table 10 below shows aspherical coefficients in the fifth example.

TABLE 10

| | | Y Radius | Conic Constant (K) | 4th Order Coefficient (A) | 6th Order Coefficient (B) | 8th Order Coefficient (C) | 10th Order Coefficient (D) |
|---|---|---|---|---|---|---|---|
| Aspherical mirror | S28 | 10.44 | −4.52 | −4.5036E−06 | −4.2266E−09 | 5.3137E−11 | −1.5953E−13 |

TABLE 10-continued

| | | | | | | | |
|---|---|---|---|---|---|---|---|
| L11 | S27 | −24.39 | 4.12 | 8.9883E−06 | 8.0378E−07 | −1.4655E−07 | 3.4677E−09 |
| | S26 | −336.58 | 10.00 | −2.2175E−04 | 1.8789E−05 | −1.5391E−06 | 5.5519E−08 |
| L10 | S25 | −19.14 | −10.00 | −4.8803E−06 | −6.3842E−07 | −1.5533E−07 | 1.2294E−09 |
| | S24 | −6.94 | 0.47 | −1.9214E−04 | −2.2537E−05 | 1.8350E−06 | −1.6083E−07 |
| L5 | S14 | 13.93 | 1.28 | 6.2654E−05 | −6.1998E−07 | 8.0109E−08 | 5.0005E−09 |
| | S13 | 9.36 | −0.27 | −6.0843E−05 | −1.4278E−06 | 2.8099E−08 | 2.1468E−09 |

| | | 12th Order Coefficient (E) | 14th Order Coefficient (F) | 16th Order Coefficient (G) | 18th Order Coefficient (H) | 20th Order Coefficient (J) |
|---|---|---|---|---|---|---|
| Aspherical mirror | S28 | 2.6398E−16 | −2.6342E−19 | 1.5706E−22 | −5.1469E−26 | 7.1281E−30 |
| L11 | S27 | −2.0790E−11 | −3.4085E−37 | −3.4085E−37 | | |
| | S26 | −1.0006E−09 | 9.1511E−12 | −3.4208E−14 | | |
| L10 | S25 | −7.0360E−35 | −3.4085E−37 | | | |
| | S24 | −7.0360E−35 | −3.4085E−37 | | | |
| L5 | S14 | 2.4307E−35 | | | | |
| | S13 | 2.4307E−35 | | | | |

In the fifth example, a fifth lens L5 of a front lens group G1 most adjacent to an image side I may be an aspherical lens, and two lenses of a rear lens group G2 most adjacent to the image side I may be aspherical lenses.

Figure 32:
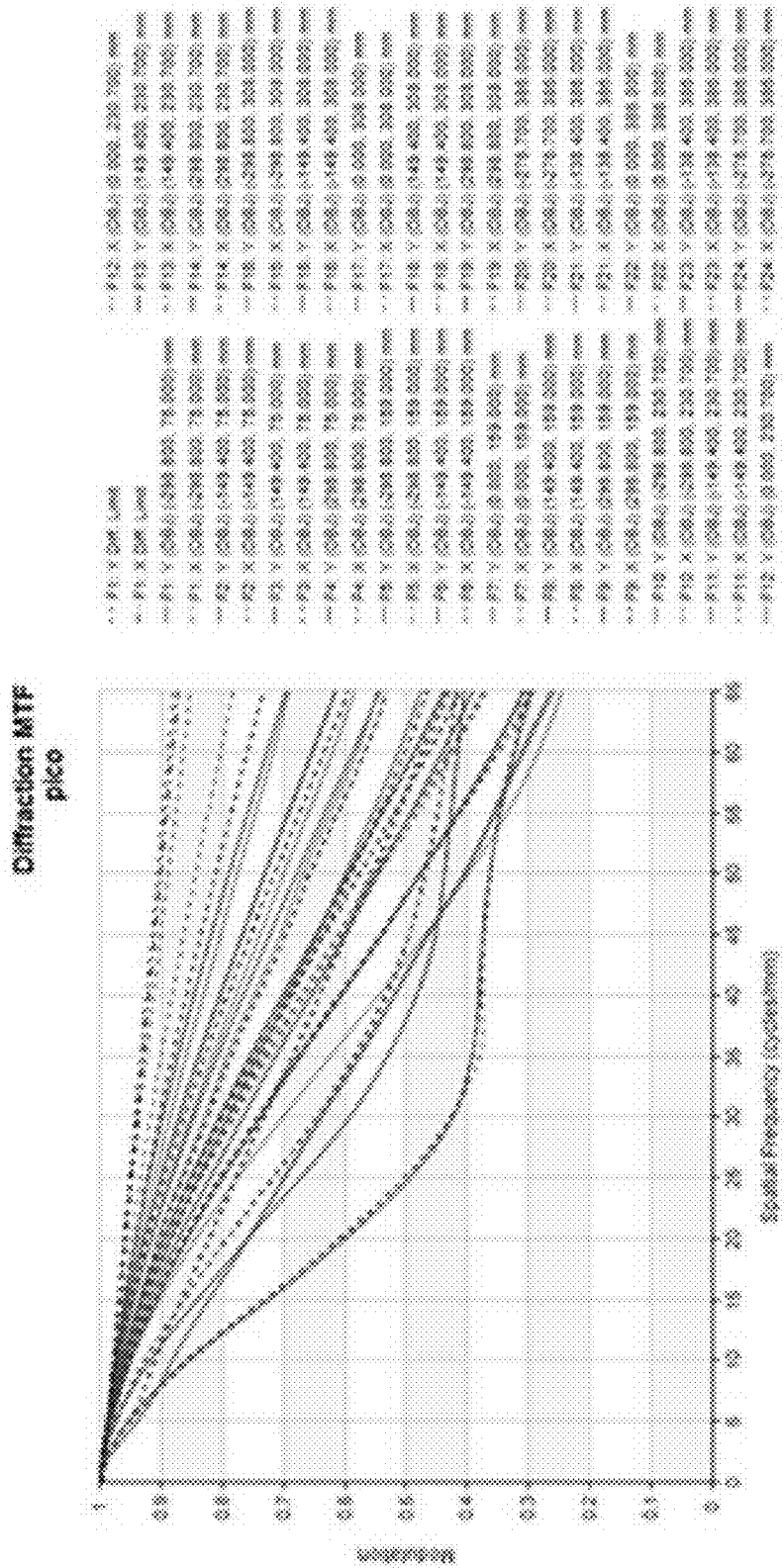
FIG. 32 is an MTF graph of a fifth example.
Figure 33:
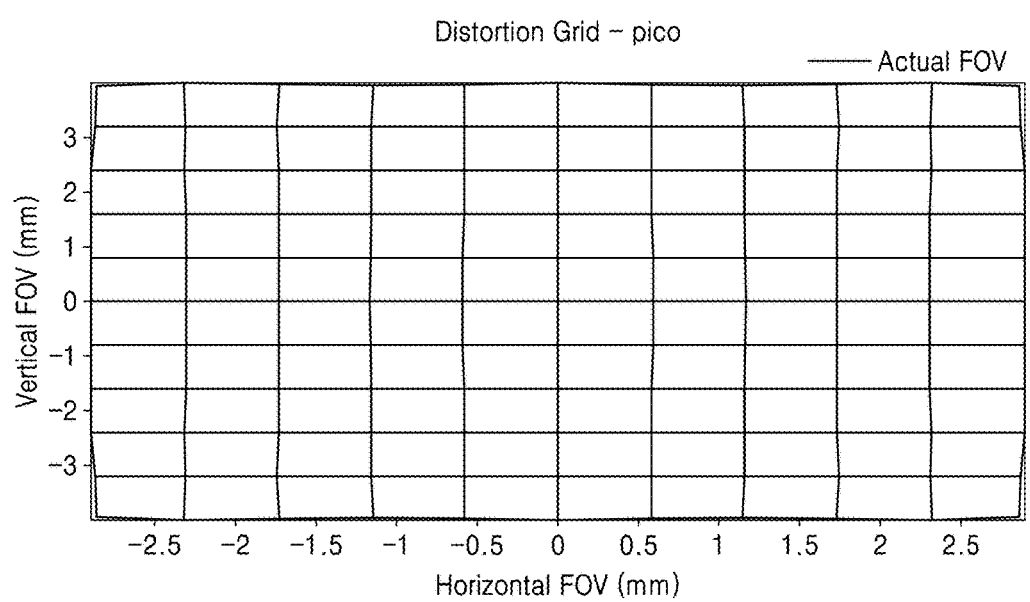
FIG. 33 is an aberration graph illustrating distortion in the fifth example.
Figure 34:
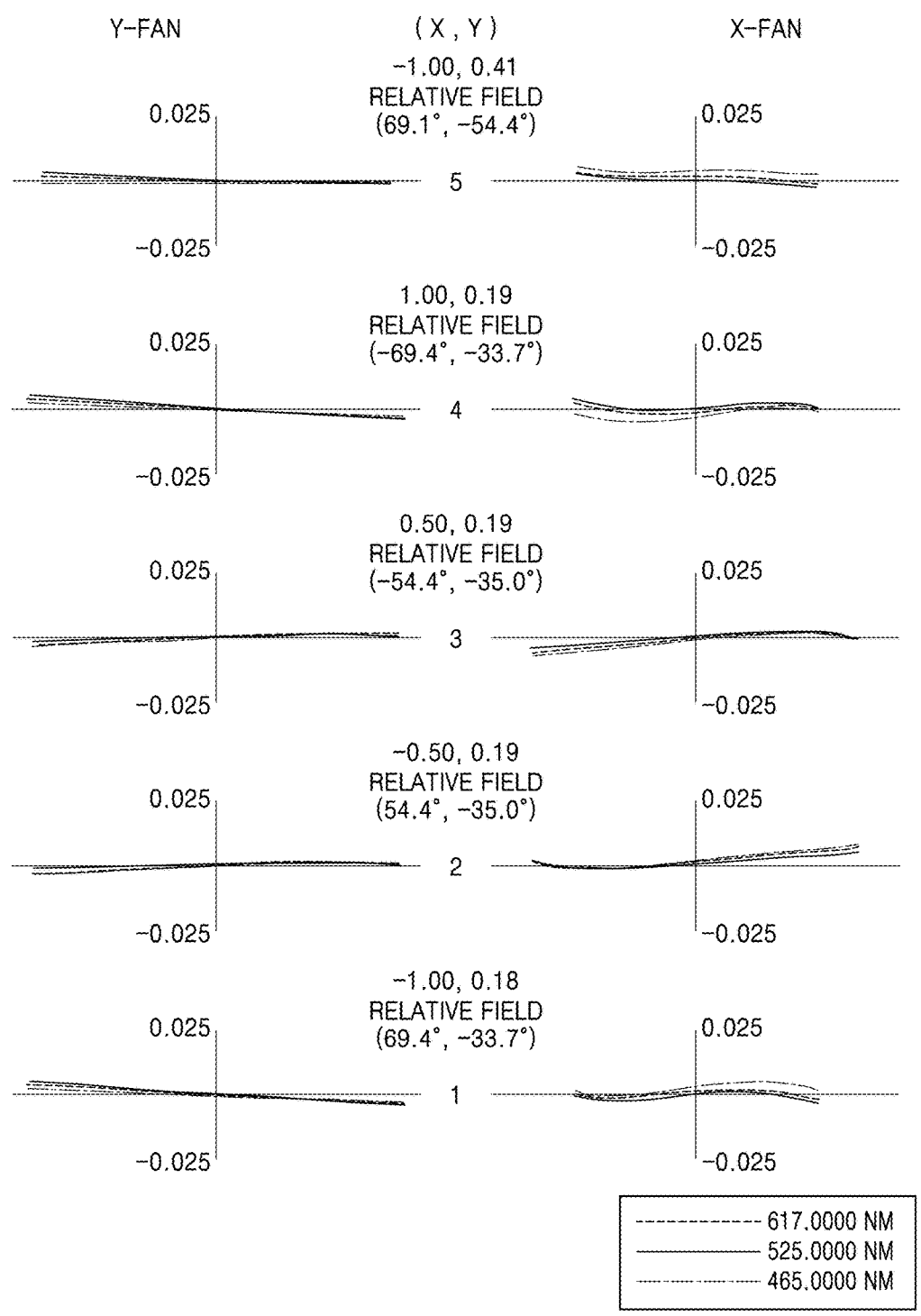
FIGS. 34, 35, 36, 37, and 38 are graphs illustrating ray aberration in each field of the projection lens system of the fifth example.
Figure 35:
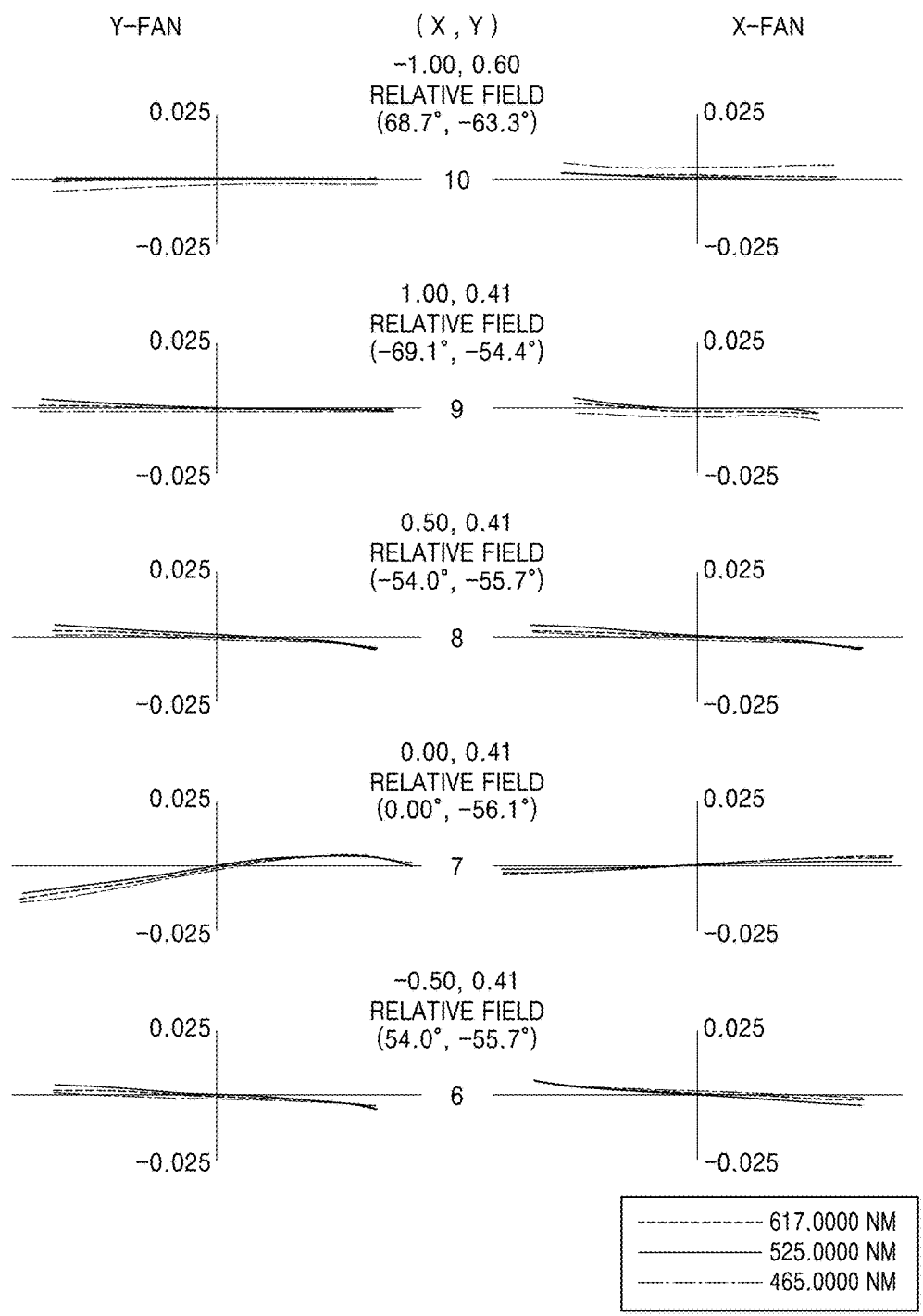
Figure 36:
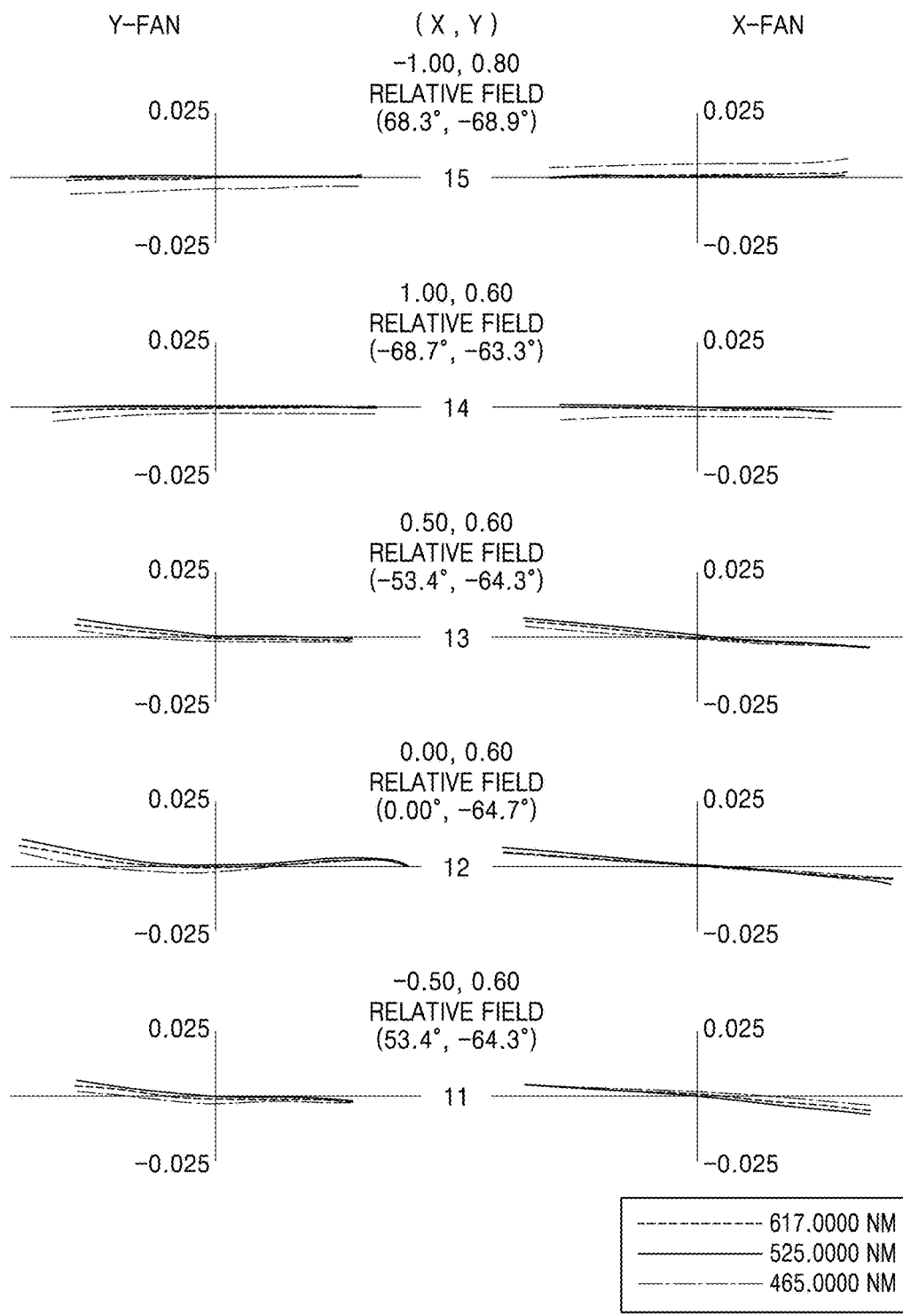
Figure 37:
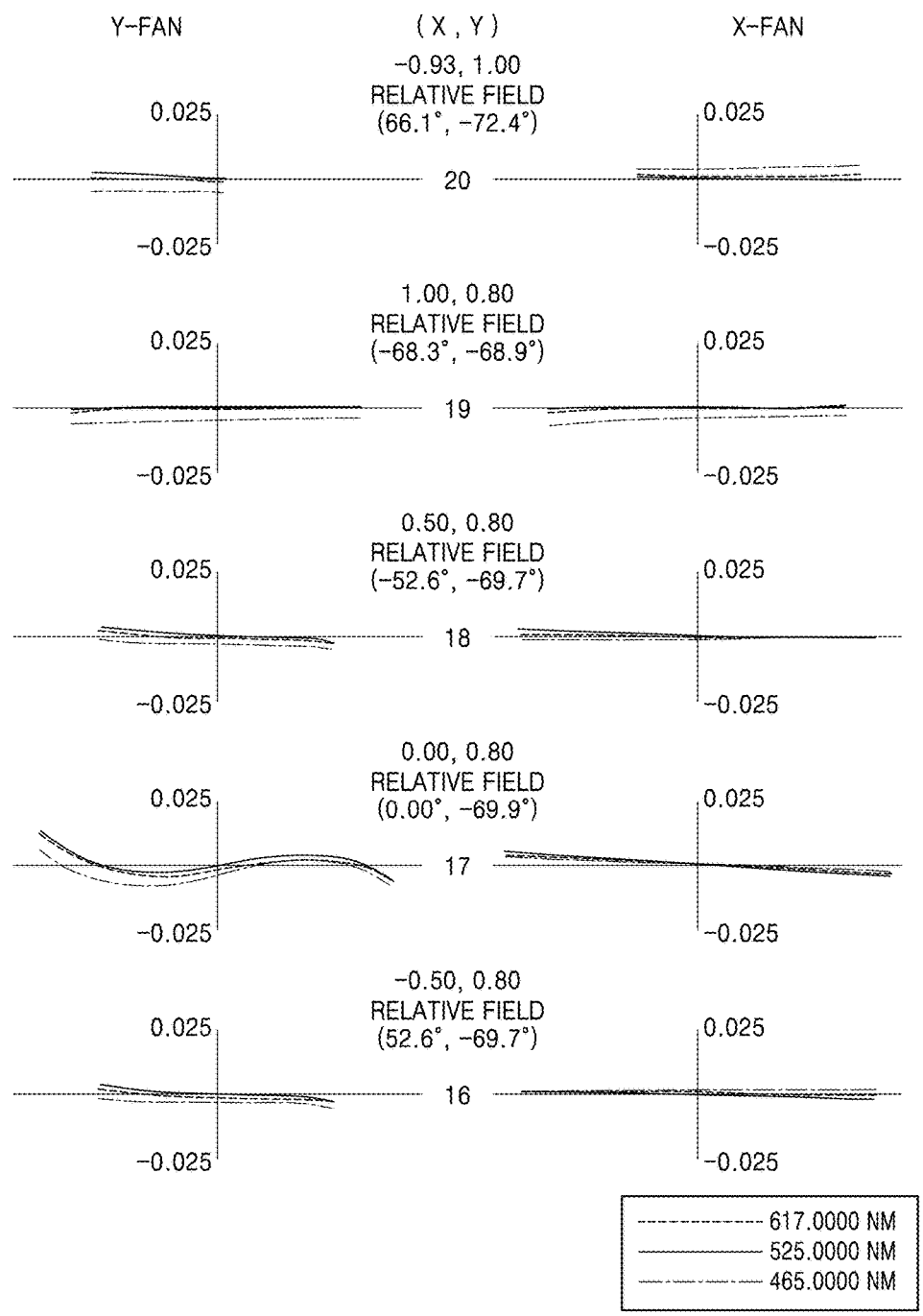
Figure 38:
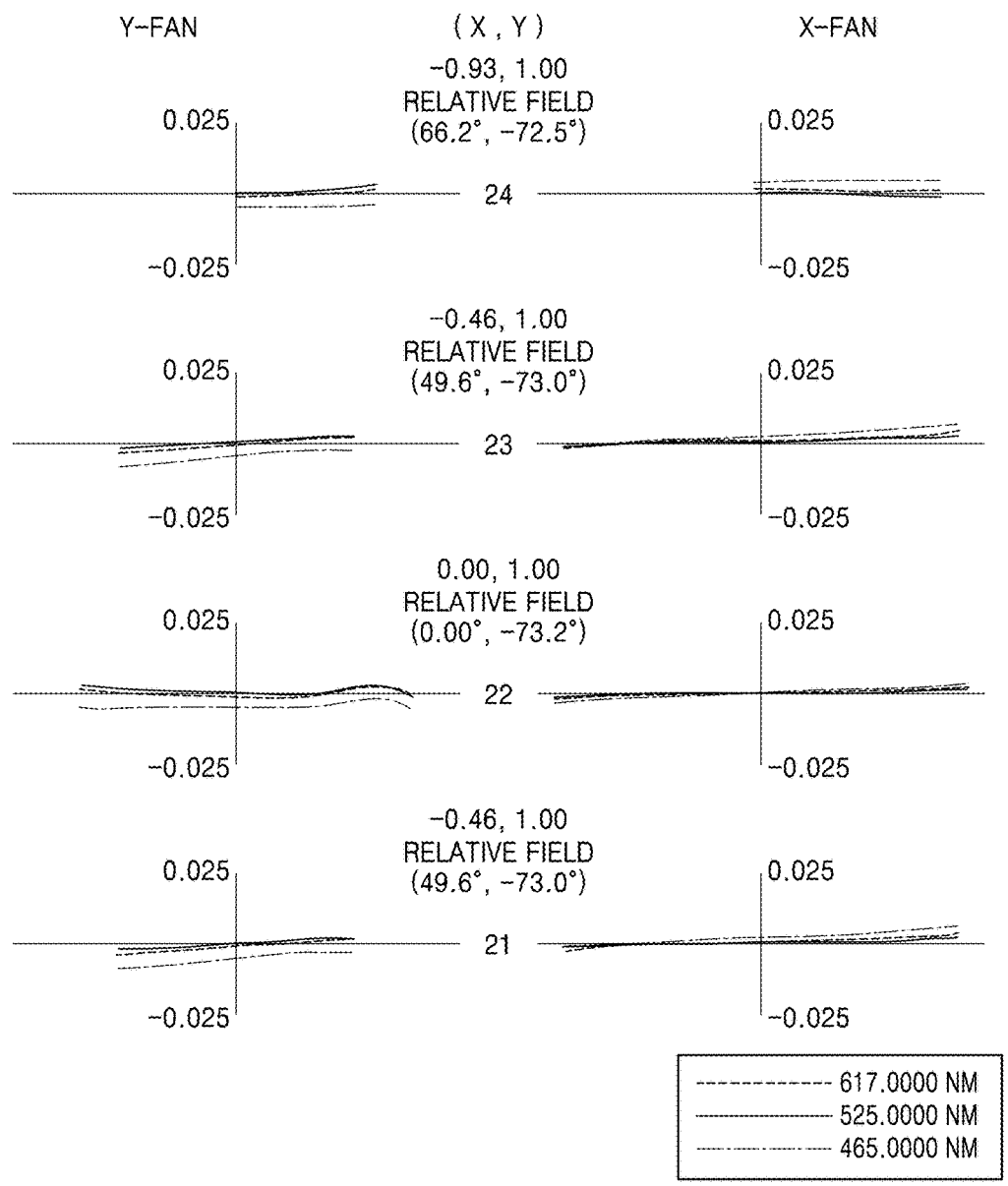

FIG. 32 is an MTF graph of a projection lens system PL of the fifth example, and FIG. 33 is a distortion graph of the projection lens system PL of the fifth example.

FIGS. 34, 35, 36, 37, and 38 illustrate ray aberration in each field of the projection lens system PL of the fifth example.

The projection lens system PL of the fifth example has an ultra short focal length, and thus, although the projection lens system PL is small, the projection lens system PL may project images in a wide field of view. In addition, the projection lens system PL of the fifth example may have a low throw ratio RT and a high resolution (MTF), and thus, images may not be distorted even though the projection distance of the projection lens system PL is short.

Table 11 below shows that the projection lens systems PL of the first to fifth numerical embodiments satisfy Equations 1 and 2.

TABLE 11

| Equations | First example | Second example | Third example | Fourth example | Fifth example |
|---|---|---|---|---|---|
| 0.1 ≤ TR ≤ 0.3 | 0.17 | 0.17 | 0.17 | 0.17 | 0.17 |
| 2.6 < \|R25/R24\| < 3.2 | 2.73 | NA | NA | 2.75 | 2.71 |

Figure 39:
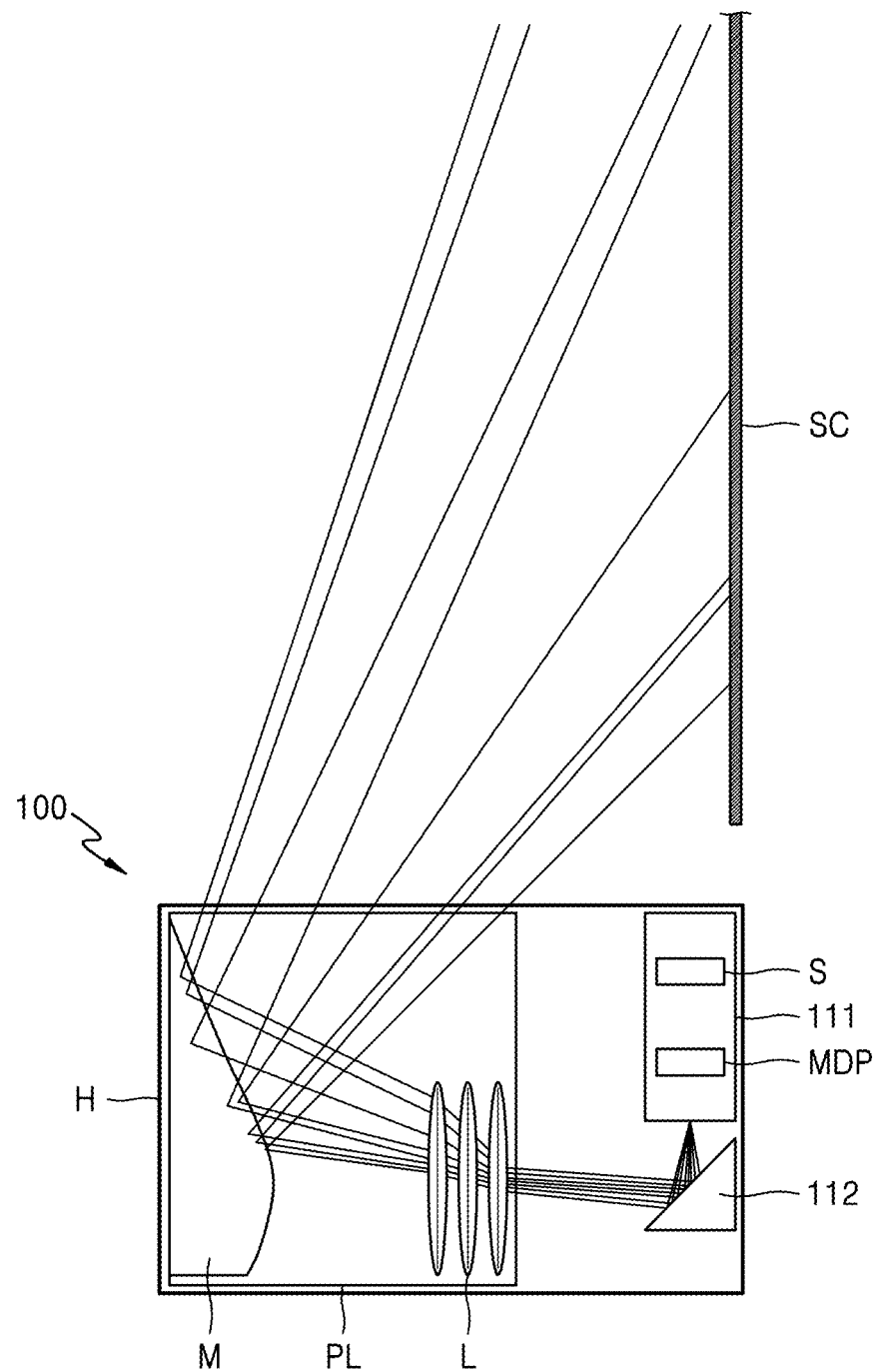
FIG. 39 is a schematic view illustrating a projection system according to an exemplary embodiment.

FIG. 39 is a schematic view illustrating a projection system 100 according to an exemplary embodiment. The projection system 100 may include: a micro-display panel MDP forming images; and a projection lens system PL placed adjacent to an image-side surface of the micro-display panel MDP.

The projection lens system PL may project images onto a screen SC on an enlarged scale. The projection lens system PL may include at least one lens L. The projection lens system PL is substantially the same as the projection lens systems PL described with reference to FIGS. 1 to 24, and a detailed description thereof will not be presented here. The projection system 100 may include an illumination optical system 111 providing images to the projection lens system PL. The illumination optical system 111 may include the micro-display panel MDP and a light source S emitting light toward the micro-display panel MDP.

The projection lens system PL may further include an optical path converter 112 configured to change an optical path of light coming from the micro-display panel MDP. For example, the optical path converter 112 may include a prism, a reflection mirror, or a beam splitter. For example, the optical path converter 112 may bend the optical path at a right angle, and thus the projection lens system PL may be more freely arranged in a given space. For example, the optical path converter 112 may bend the optical path so that lenses of the projection lens system PL may be arranged in a direction perpendicular to the screen SC. Since the illumination optical system 111 and the projection lens system PL are arranged in a folded form using the optical path converter 112, the projection system 100 may have a small size while maintaining an optical distance. That is, even though the projection system 100 is small, a projection distance may be ensured. In another exemplary embodiment, however, the illumination optical system 111 and the projection lens system PL may be arranged in a row without using the optical path converter 112.

The projection lens system PL may further include a mirror M. The mirror M may be an aspherical mirror having a convex shape. The mirror M may reflect images transmitted from the micro-display panel MDP toward the screen SC on an enlarged scale. The mirror M may change the projection direction of images. For example, images may be projected upward on an enlarged scale by using the mirror M.

The illumination optical system 111 and the projection lens system PL may be arranged in a housing H.

Since the projection lens system PL has an ultra short focal length, images may be projected onto a large screen even though a projection distance is short. For example, when a projection distance is about 8 cm to about 15 cm, images may be projected in a lateral direction on an enlarged scale by using the mirror M, and then the images may be displayed with low distortion on a large screen having a size of 25 inches or greater. However, the projection system 100 is not limited thereto. That is, the projection system 100 may be used in applications having various projection distances and various screen sizes.

The projection lens system PL of an exemplary embodiment is small and easy to carry, and may be combined with an image display such as a cellular phone. Therefore, the projection system 100 may be usefully used in outdoor and indoor areas without a limitation to location and special equipment.

Although a few exemplary embodiments have been shown and described, exemplary embodiments are not limited thereto. It would be appreciated by those skilled in the art that changes may be made in these exemplary embodiments without departing from the principles and spirit of the disclosure, the scope of which is defined in the claims and their equivalents.

What is claimed is:

1. A projection lens system arranged between an object side at which a micro-display panel is located and an image side opposite to the object side, the projection lens system comprising:
   an aperture stop;
   a front lens group arranged at an object-side of the aperture stop and having a positive refractive power;
   a rear lens group arranged at an image-side of the aperture stop, the rear lens group comprising a first aspherical lens at a position closest to the image side and a second aspherical lens adjacent to an object-side surface of the first aspherical lens, the object-side surface of the first aspherical lens being proximate to the object side; and
   an aspherical mirror which has a negative refractive power and reflects light coming from the rear lens group toward a screen,
   wherein the front lens group comprises a third aspherical lens disposed at a position closest to the image side, and
   the projection lens system satisfies the following equation:

$2.6 < |R25/R24| < 3.2$, where R24 is a radius of a curvature of an object-side surface of the second aspherical lens, the object-side surface of the second aspherical lens being proximate to the object side, and
   R25 is a radius of a curvature of an image-side surface of the second aspherical lens, the image-side surface of the second aspherical lens being proximate to the image side.

2. The projection lens system of claim 1, further comprising:
   an optical path converter disposed between the front lens group and the micro-display panel to change an optical path of the light.

3. The projection lens system of claim 1, wherein the rear lens group comprises:
   a first sub-lens group having a positive refractive power; and
   a second sub-lens group having a negative refractive power,
   wherein the first sub-lens group and the second sub-lens group are arranged in a direction from the object side toward the image side, in this order, and
   the first aspherical lens and the second aspherical lens are included in the second sub-lens group.

4. The projection lens system of claim 1, wherein the projection lens system has a throw ratio (TR) satisfying the following equation:

$0.1 \leq TR \leq 0.3$.

5. The projection lens system of claim 4, wherein the projection lens system has a projection distance of about 15 cm or shorter.

6. The projection lens system of claim 5, wherein the projection lens system has the projection distance of about 12 cm or shorter.

7. The projection lens system of claim 1, wherein the projection lens system has a focal length of about 1.5 mm or shorter.

8. A projection lens system arranged between an object side at which a micro-display panel is located and an image side opposite to the object side, the projection lens system comprising:
   an aperture stop;
   a front lens group arranged at an object-side of the aperture stop and having a positive refractive power;
   a rear lens group arranged at an image-side of the aperture stop, the rear lens group comprising a first sub-lens group having a positive refractive power and a second sub-lens group having a negative refractive power; and
   an aspherical mirror which has a negative refractive power and reflects light coming from the rear lens group toward a screen,
   wherein the front lens group comprises an aspherical lens disposed at a position closest to the image side, the aspherical lens comprising an image-side surface which is convex toward the object side, the image-side surface being proximate to the image side.

9. The projection lens system of claim 8, further comprising:
   an optical path converter disposed between the front lens group and the micro-display panel to change an optical path of the light.

10. The projection lens system of claim 8, wherein the projection lens system has a projection distance of about 15 cm or shorter.

11. A projection lens system arranged between an object side at which a micro-display panel is located and an image side opposite the object side, the projection lens system comprising:
    an aperture stop;
    a front lens group arranged at an object-side of the aperture stop and having a positive refractive power;
    a rear lens group arranged at an image-side of the aperture stop, the rear lens group comprising a first aspherical lens disposed at a position closest to the image side and a second aspherical lens adjacent to an object-side surface of the first aspherical lens, the object-side surface of the first aspherical lens being proximate to the object side; and
    an aspherical mirror which has a negative refractive power and reflects light coming from the rear lens group toward a screen,
    wherein the front lens group comprises a third aspherical lens disposed at a position closest to the image side, and
    the projection lens system has a throw ratio (TR) satisfying the following equation:

$0.1 \leq TR \leq 0.3$.

12. The projection lens system of claim 11, further comprising:
    an optical path converter disposed between the front lens group and the micro-display panel to change an optical path of the light.

13. The projection lens system of claim 11, wherein the rear lens group comprises:
    a first sub-lens group having a positive refractive power; and
    a second sub-lens group having a negative refractive power,
    wherein the first sub-lens group and the second sub-lens group are arranged in a direction from the object side toward the image side, in this order, and the first aspherical lens and the second aspherical lens are included in the second sub-lens group.

14. The projection lens system of claim 11, wherein the projection lens system has a projection distance of about 15 cm or shorter.

15. The projection lens system of claim 11, wherein the projection lens system has a focal length of about 1.5 mm or shorter.

16. The projection lens system of claim 11, wherein the projection lens system has a field of view within a range of about 140° or greater.

* * * * *